(12) United States Patent
Krishnan

(10) Patent No.: US 6,377,685 B1
(45) Date of Patent: Apr. 23, 2002

(54) CLUSTER KEY ARRANGEMENT

(76) Inventor: Ravi C. Krishnan, 10112 Parkwood Ter., Bethesda, MD (US) 20814

(*) Notice: Subject to any disclaimer, the term of this patent is extended or adjusted under 35 U.S.C. 154(b) by 0 days.

(21) Appl. No.: 09/296,809

(22) Filed: Apr. 23, 1999

(51) Int. Cl.$^7$ ................................................ H04M 1/00
(52) U.S. Cl. ............................... 379/433.07; 379/368
(58) Field of Search ................................ 379/368, 369, 379/370, 433.06, 433.07; 455/405; 200/5 A

(56) References Cited

U.S. PATENT DOCUMENTS

| | | | |
|---|---|---|---|
| 4,370,528 A | 1/1983 | Aschenbach | 200/6 BB |
| 4,418,247 A | 11/1983 | Hansen | 156/196 |
| 4,439,647 A | 3/1984 | Calandrello | 200/5 A |
| 4,680,577 A | 7/1987 | Straayer et al. | 345/160 |
| 4,687,200 A | 8/1987 | Shirai | 463/37 |
| 4,891,777 A | 1/1990 | Lapeyre | 708/130 |
| 4,918,264 A | 4/1990 | Yamamoto et al. | 200/5 R |
| 5,057,657 A | 10/1991 | Skulic | 200/517 |
| 5,227,594 A | 7/1993 | Russo | 200/6 A |
| 5,253,940 A | 10/1993 | Abecassis | 400/495 |
| 5,339,358 A | 8/1994 | Danish et al. | 379/368 |
| 5,378,862 A | 1/1995 | Tasaka et al. | 200/6 A |
| 5,386,091 A | 1/1995 | Clancy | 200/517 |
| 5,396,030 A | 3/1995 | Matsumiya et al. | 200/6 A |
| 5,430,262 A | 7/1995 | Matsui et al. | 200/5 A |
| 5,598,469 A | * 1/1997 | Preker | 379/433.07 |
| 5,612,690 A | 3/1997 | Levy | 341/22 |
| 5,631,453 A | 5/1997 | Maeda | 200/6 A |
| 5,666,113 A | 9/1997 | Logan | 341/34 |
| 5,758,295 A | 5/1998 | Ahlberg et al. | 455/566 |
| D397,694 S | 9/1998 | Mischenko et al. | D14/248 |
| 5,818,437 A | 10/1998 | Grover et al. | 345/326 |
| 5,818,915 A | * 10/1998 | Hayes, Jr. et al. | 455/405 |
| 5,841,374 A | 11/1998 | Abraham | 341/34 |
| 5,844,506 A | 12/1998 | Binstead | 341/34 |
| 5,852,414 A | 12/1998 | Yu et al. | 341/22 |
| 5,861,823 A | 1/1999 | Strauch et al. | 341/22 |

FOREIGN PATENT DOCUMENTS

| | | |
|---|---|---|
| DE | 3234417 | 3/1984 |
| DE | 3532201 | 3/1987 |
| GB | 1035193 | 7/1966 |
| GB | 1313754 | 4/1973 |
| JP | 1-93249 | 4/1989 |

OTHER PUBLICATIONS

An article entitled "Semi–Captive Keyboard", published in Feb., 1976 in Xerox Disclosure Journal vol. 1 No. 2, p. 85.

An article entitled "Compact Computer Keyboard", published in Mar., 1985 in IBM Technical Disclosure Bulletin, vol. 27 No. 10A, pp. 5640–5642.

An article entitled "Smart Key" published in Oct., 1985 in IBM Technical Disclosure Bulletin vol. 28 No. 5, pp. 1859–1860.

An article entitled "Space Bar That Rolls", published in Aug., 1989 in IBM Technical Disclosure Bulletin vol. 32 No. 3B, pp. 700–701.

An article entitled "The ABCs of Keypad Logic", by Mike Mills, published Feb., 15, 1999 in the Washington Post.

An article entitled "Inventor on the Verge of a Nervous Breakthrough", by David Stipp, published Mar. 29, 1999 in Fortune Magazine, pp. 106–116.

* cited by examiner

*Primary Examiner*—Jack Chiang
(74) *Attorney, Agent, or Firm*—Richard C. Litman

(57) ABSTRACT

A cluster key arrangement may be mechanically configured or electronically configured. The cluster key arrangement may include twelve cluster keys configured in an arrangement of three columns by four rows, such as conventionally found on standard telephones. The cluster key arrangement may also be configured for use on cellular/mobile telephones, television remote controls, other handheld data entry devices, automotive controls, desktop/wall-mounted/cordless telephones, combination telephone recorders, Personal Digital Assistants, and other electronic devices. The mechanically or electronically configured cluster keys provide a user with the ability to select one of a plurality of key elements representing numbers, letters, symbols, functions, etc., in a mutually exclusive manner.

39 Claims, 11 Drawing Sheets

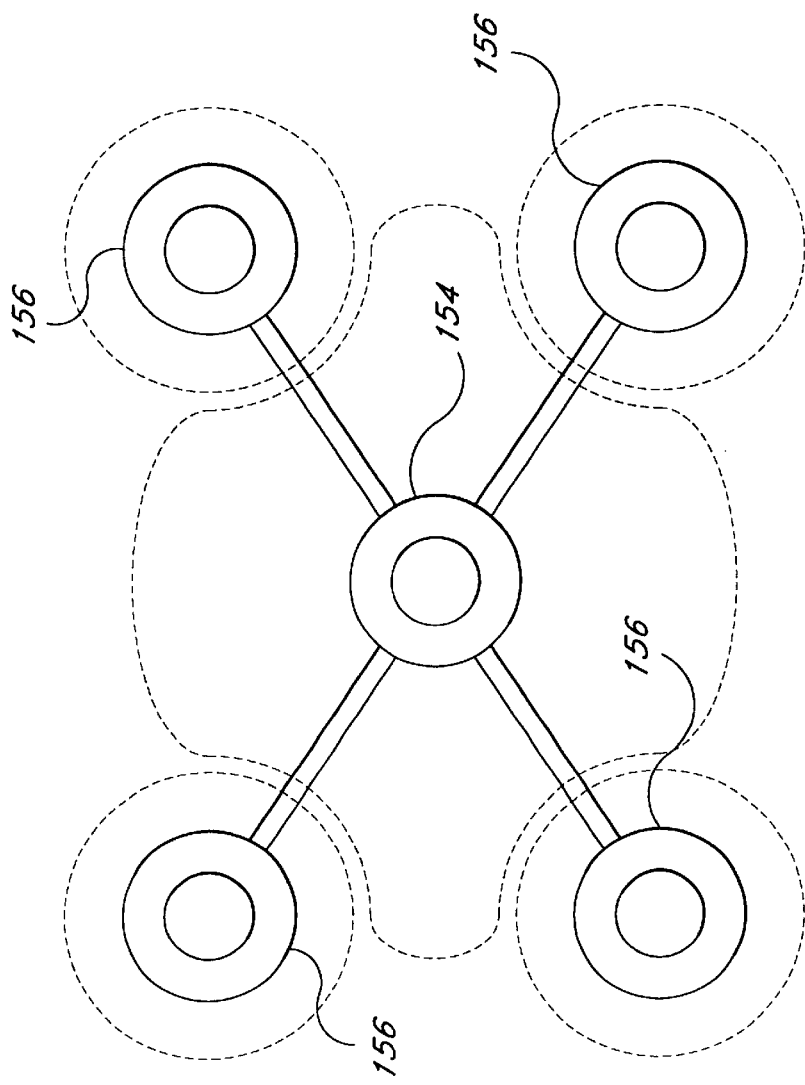
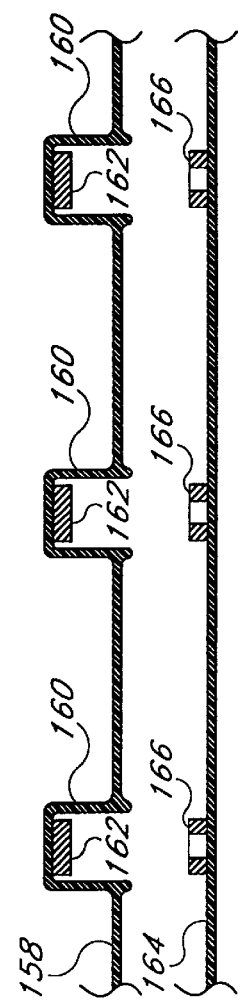
Fig. 6A
Fig. 6B

CLUSTER KEY ARRANGEMENT

BACKGROUND OF THE INVENTION

1. Field of the Invention

The present invention relates to a cluster key arrangement which provides a user with the ability to select one of a plurality of key elements representing numbers, letters, symbols, functions, etc., in a mutually exclusive manner.

2. Description of the Related Art

The touch-tone dial system has become the standard dialing system for conventional telephones, largely replacing the older rotary dial. The standard touch-tone dials have push-buttons arranged in a rectangular matrix pattern. Each button activates a switch to energize a tone generator of unique frequency. In addition, the push-buttons are arranged to activate a common switch for disconnecting the transmitter while a tone generator is operating.

Use of a telephone keypad with a telephone keypad matrix as a data terminal for the input of alphanumeric characters into a computer system, using or via a telephone line which further in turn forwards the message from the terminal to a service provider computer, such as a paging system, facsimile device, e-mail and/or voice mail system, or Personal Digital Assistants (PDAs) which have the ability to store schedules, memos, etc., and further have the ability to upload and download information from a base computer, which are operated on an on-board battery with an operating life of many days for a monochrome display, and an operating life of on the order of six hours for displays with color capability which are increasingly desirable for clarity and user friendliness, and cellular phones with desirable code division multiple access (CDMA) technology which provides for better voice quality and security having only about two to three hours of CDMA talk time are some of the trends in this area.

The most obvious form of elementary clustering is noticed in the standard 102 or 104 key personal computer keyboards in the grouping of the directional arrows. Other than copying this idea on some cellular telephone models, this has not resulted in any clustering of other keys either in patents or in commercially available products. Thus, what is being proposed here is not a mere extension of the preceding, which would be obvious to those skilled in the art. Rather, what is being proposed here derives from an identification of the deficiencies of the prior art and an invention that overcomes those deficiencies.

It is worthwhile to review contradictions between standards that have come about due to their divergent origins but nonetheless find themselves in a convergent path due to emergence of technology driven changes. The most obvious example is the "789" arrangement of the calculator industry and the "123" arrangement of the pushbutton telephone. The horizontal "1234567890" derived from the "QWERTY" typewriter keyboard forms the backbone of computer data entry with the "789" calculator still present on the right hand side as a rarely used vestigial organ. Most of the numerical entries are done on the QWERTY side. Other non-QWERTY approaches, although better in concept have not really taken off. The preceding is mentioned also to reinforce that certain consumer "corporate memory" driven preferences will prevail as in QWERTY and in other cases the "123" of the telephone has clearly become more dominant instead of the "789" of the calculator. However, the same "123" additional alphabet assignments, upon "force fitting" them for additional uses such as for paging and e-mails have not been user friendly.

Most cell phones serve the purpose of audio(voice) interaction and are often used in unsafe but widely prevalent "while driving in an automobile mode". Typically numbers are punched in or a received call is answered by pressing a button most often with the thumb. Thus, user friendliness based on ergonomic features is a must. Thus, making the individual number buttons as large as possible is a must. In reality all products in the market have seen a trend toward miniaturization of the keycap size, driven by factors such as: (1) relentless downsizing in width (Ericsson KH668 is 1 ¾" for example contrasted with Nokia 2190 at 2 ¼" and Casio's CP-850 cordless telephone is 2 ¼") Product sleekness can still be achieved by better utilization of the space available; (2) "Real Estate" requirements for the liquid crystal display and the control keys have made the keypad size shrink further in the top vertical direction, typically being 1 ¾" for the primary keys (1, 2, 3, 4, 5, 6, 7, 8, 9, 0, *, and #). In most cell phones, the control keys comprising ON/OFF and NO/END are in one button (in Ericsson KH668), the SEND or YES (to answer an incoming call) is a second button, a CLEAR button along with two forward and backward arrows make up five keys. An additional switch may be located on the side surface. Conceptually, the prior art deficiency stems from on the one hand mindless and unimaginative miniaturization of the human interface in attempting to keep up with electronic miniaturization and assuming wrongly that all the control keys need to beg associated with the display and consequently are better positioned at the top in one separate row which happens to take up the most space. In actuality, the two largest keys (ON/OFF and NO/END) and (SEND/YES) have more functional association with the primary function of the telephone without a display. The minimal set of keys for the display are three, i.e. CLEAR, and two arrow keys.

The related art is represented by the following patents of interest.

U.S. Design Pat. No. 397,694, issued on Sep. 1, 1998; to Nicholas Mischenko et al., shows an ornamental design for a faceplate having a keypad cover for a portable telephone. Mischenko et al. do not suggest a cluster key arrangement according to the claimed invention.

U.S. Pat. No. 4,370,528, issued on Jan. 25, 1983 to Louis F. Aschenbach, describes a miniature sealed toggle switch. Aschenbach does not suggest a cluster key arrangement according to the claimed invention.

U.S. Pat. No. 4,418,247, issued on Nov. 29, 1983 to Kaj B. Hansen, describes an electrodynamic transducer which has an, additionally improved sensitivity and can be produced almost completely automatically. Hansen does not suggest a cluster key arrangement according to the claimed invention.

U.S. Pat. No. 4,439,647, issued on Mar. 27, 1984 to Nick Calandrello, describes a capacitive keyboard which uses a standard printed circuit board provided in various locations with spaced conductor pairs. Calandrello does not suggest a cluster key arrangement according to the claimed invention.

U.S. Pat. No. 4,680,577, issued on Jul. 14, 1987 to David H. Straayer et al., describes a multipurpose keyswitch for controlling cursor movement on a CRT display and for character entry. Straayer et al. do not suggest a cluster key arrangement according to the claimed invention.

U.S. Pat. No. 4,687,200, issued on Aug. 18, 1987 to Ichiro Shirai, describes a multi-directional switch in which on-off operation of multiple contacts is dependent on the pressing directions of the switch. Shirai does not suggest a cluster key arrangement according to the claimed invention.

U.S. Pat. No. 4,891,777, issued on Jan. 2, 1990 to James M. Lapeyre, describes a keyboard for use by one hand and adapted for entry of a large number of selections including those for alphanumeric data processing and a large range of computer operation commands. Lapeyre does not suggest a cluster key arrangement according to the claimed invention.

U.S. Pat. No. 4,918,264, issued on Apr. 17, 1990 to Masato Yamamoto et al., describes a switching device capable of I returning to the neutral position of the operating member or centering itself by the resilience of a rubber switch. Yamamoto et al. do not suggest a cluster key arrangement according to the claimed invention.

U.S. Pat. No. 5,057,657, issued on Oct. 15, 1991 to Vedran Skulic, describes a low profile keyboard switch, having tactile and/or audible attributes for use in combination with a digitally operable, membrane switch array. Skulic does not suggest a cluster key arrangement according to the claimed invention.

U.S. Pat. No. 5,227,594, issued on Jul. 13, 1993 to Louis G. Russo, describes an electrical switch assembly. Russo does not suggest a cluster key arrangement according to the claimed invention.

U.S. Pat. No. 5,253,940, issued on Oct. 19, 1993 to Max Abecassis, describes a method to arrive at a single standard for numeric keypad layouts that provides consumers the means to set for themselves a single numeric keypad standard, and in this manner lead to the abandonment of layouts inconsistent with the layout incorporated on telephone devices. Abecassis does not suggest a cluster key arrangement according to the claimed invention.

U.S. Pat. No. 5,339,358, issued on Aug. 16, 1994 to Adel Danish et al., describes a data terminal enabling a user to easily input alphabetical, as well as numerical characters, into a telephone for input to a computer which in turn accesses a service provider computer. Danish et al. do not suggest a cluster key arrangement according to the claimed invention.

U.S. Pat. No. 5,378,862, issued on Jan. 3, 1995 to Hideo Tasaka et al., describes a switch which provides different switching inputs by pushing different operating portions of a single operating button. Tasaka et al. do not suggest a cluster key arrangement according to the claimed invention.

U.S. Pat. No. 5,386,091, issued on Jan. 31, 1995 to Kevin F. Clancy, describes a low profile keyswitch for use with a computer keyboard, calculator and other electronic machines that process data and information. Clancy does not suggest a cluster key arrangement according to the claimed invention.

U.S. Pat. No. 5,396,030, issued on Mar. 7, 1995 to Hiroshi Matsumiya et al., describes a control-key mechanism. Matsumiya et al. do not suggest a cluster key arrangement according to the claimed invention.

U.S. Pat. No. 5,430,262, issued on Jul. 4, 1995 to Hiroshi Matsui et al., describes a combination push switch device comprising a single push button with at least two push members which can independently operate at least two switch elements. Matsui et al. do not suggest a cluster key arrangement according to the claimed invention.

U.S. Pat. No. 5,612,690, issued on Mar. 18, 1997 to David Levy, describes a compact keypad system in which each function may be actuated comfortably by an adult-sized human finger. The key pad electronics are designed to register simultaneously actuated keycaps at an interstice as an input uniquely associated with the symbol located at the interstice. This distinguishes over the present invention because in the present invention a single character is generated in a mutually exclusive manner depending upon which specific key of a cluster key is depressed. Levy does not suggest a cluster key arrangement according to the claimed invention.

U.S. Pat. No. 5,631,453, issued on May 20, 1997 to Takuya Maeda, describes a multi-way flipping switch in which a movable contact can be reliably brought into contact with a stationary contact to thereby attain a stable contact state, and is capable of preventing two or more pairs of switching elements from being simultaneously turned on while securing the requisite waterproofness for the contact section. Maeda does not suggest a cluster key arrangement according to the claimed invention.

U.S. Pat. No. 5,666,113, issued on Sep. 9, 1997 to James D. Logan, describes a system which automatically switches uses of a touch sensitive computer input touchpad between the functions of cursor control and keypad emulation. Logan does not suggest a cluster key arrangement according to the claimed invention.

U.S. Pat. No. 5,758,295, issued on May 26, 1998 to Bjorn Ahlberg et al., describes a single mode mobile cellular telephone with a man-machine interface which is the same for all cellular telephone systems. Ahlberg et al. do not suggest a cluster key arrangement according to the claimed invention.

U.S. Pat. No. 5,818,437, issued on Oct. 6, 1998 to Dale L. Grover et al., describes a highly efficient reduced keyboard which is used in conjunction with a display. The keyboard has twelve keys, nine of them labeled with numerous letters and other symbols, and those nine plus one more are labeled with one of the ten digits. Textural entry keystrokes are ambiguous. The user strikes a delimiting "select" key at the end of each word, delimiting a keystroke sequence which could match any of many words with the same number of letters. The keystroke sequence is processed with a complete dictionary, and words which match the sequence of keystrokes are presented to the user in order of decreasing frequency of use. The user selects the desired word. The letters are assigned to the keys in a non-sequential order which reduces chances of ambiguities. The present invention generates a single character in a mutually exclusive manner depending upon which specific key of a cluster key is depressed. Grover et al. do not suggest a cluster key arrangement according to the claimed invention.

U.S. Pat. No. 5,841,374, issued on Nov. 24, 1998 to Joseph N. Abraham, describes a compact, pocket computer for word processing utilizing keys which combine a plurality of toggle switches or multidirectional keys in a pocket size case. Abraham does not suggest a cluster key arrangement according to the claimed invention.

U.S. Pat. No. 5,844,506, issued on Dec. 1, 1998 to Ronald P. Binstead, describes a touchpad comprising an electrically insulating membrane with a first series of spaced apart conductors on a first face of the membrane and a second series of spaced apart conductors on or proximal thereto, in which there is no electrical contact between the first and second series of conductors. Binstead does not suggest a cluster key arrangement according to the claimed invention.

U.S. Pat. No. 5,852,414, issued on Dec. 22, 1998 to Seymour H. Yu et al., describes a triangle-shaped 4-way-switching key for a keypad consisting of 10 keys alternating upwards and downwards pointing positioned for entering alphanumeric data into a computer or communication device. Yu et al. does not suggest a cluster key arrangement according to the claimed invention.

U.S. Pat. No. 5,861,823, issued on Jan. 19, 1999 to Gary J. Strauch et al., describes a data entry device having multifunction keys, which can produce more than one character depending upon how the key is depressed. Separation of the intended function of depressing the central primary key is achieved in all three embodiments through a second function key which puts the device in a primary function or a multifunction mode. Strauch et al. requires the generation of at least two characters, a primary character and at least one secondary character, upon depression of any key. This distinguishes over the present invention because in the present invention a single character is generated in a mutually exclusive manner depending upon which specific key of a cluster key is depressed. Strauch et al. does not suggest a cluster key arrangement according to the claimed invention.

Germany Patent document 3,234,417 A1, published on Mar. 22, 1984, describes a keyboard for generating an alphanumerical symbol. Germany '417 does not suggest a cluster key arrangement according to the claimed invention.

Germany Patent document 3,532,201 A1, published on Mar. 19, 1987, describes an electronic keyboard. Germany '201 does not suggest a cluster key arrangement according to the claimed invention.

Great Britain Patent document 1,035,193, published on Jul. 6, 1966, describes an electric switch which includes fixed contacts and a moving bridging contact in the form of a surface of revolution carried by a support on which it is free to turn about its axis and with which it can be moved generally in a radial direction at right angles to the line joining the fixed contacts to engage them. Great Britain '193 does not suggest a cluster key arrangement according to the claimed invention.

Great Britain Patent document 1,313,754, published on Apr. 18, 1973, describes a joystick controlled switch apparatus comprising an operating lever rotatable about a pivot point in a support intermediate first and second portions of the lever. Great Britain '754 does not suggest a cluster key arrangement according to the claimed invention.

Japan Patent document 1-93249, published on Apr. 12, 1989, describes a character information input device. Japan '249 does not suggest a cluster key arrangement according to the claimed invention.

An article entitled "THE ABCs OF KEYPAD LOGIC", by Mike Mills, published Feb., 15, 1999 in the Washington Post, describes a keypad operating in conjunction with software to disambiguate keystrokes entered by a user to make a highly educated guess of what the user is trying to spell. The keyboard has twelve keys, nine of them labeled with numerous letters and other symbols, and those nine plus one more are labeled with one of the ten digits. Textural entry keystrokes are ambiguous. The user strikes a delimiting "select" key at the end of each word, delimiting a keystroke sequence which could match any of many words with the same number of letters. The keystroke sequence is processed with a complete dictionary, and words which match the sequence of keystrokes are presented to the user in order of decreasing frequency of use. The use selects the desired word. The letters are assigned to the keys in a non-sequential order which reduces chances of ambiguities. The present invention generates a single character in a mutually exclusive manner depending upon which specific key of a cluster key is depressed. This article does not suggest a cluster key arrangement according to the claimed invention.

An article entitled "INVENTOR ON THE VERGE OF A NERVOUS BREAKTHROUGH", by David Stipp, published Mar. 29, 1999 in Fortune Magazine, pages 106–116, describes a palm-sized keyboard with full-sized keys. This article does not suggest a cluster key arrangement according to the claimed invention.

An article entitled "SEMI-CAPTIVE KEYBOARD", published in February, 1976 in Xerox Disclosure Journal Vol. 1 Number 2, page 85, describes a keyboard for information encoding with minimal finger movement by the operator. This article does not suggest a cluster key arrangement according to the claimed invention.

An article entitled "COMPACT COMPUTER KEYBOARD", published in March, 1985 in IBM Technical Disclosure Bulletin, Vol. 27 No. 10A, pages 5640–5642, describes a small computer keyboard that retains the conventional spatial relationships among the alphabetic keys without reducing the standard surface area for finger contact on each key or the spacing between adjacent keys. This article does not suggest a cluster key arrangement according to the claimed invention.

An article entitled "SMART KEY", published in October, 1985 in IBM Technical Disclosure Bulletin Vol. 28 No. 5, pages 1859–1860, describes a special key positioned on the keyboard portion of an interactive terminal for controlling cursor positioning at the terminal display by touch control. This article does not suggest a cluster key arrangement according to the claimed invention.

An article entitled "SPACE BAR THAT ROLLS", published in August, 1989 in IBM Technical Disclosure Bulletin Vol. 32 No. 3B, pages 700–701, describes a space bar which can rotate along its long axis in order to provide an additional function. This article does not suggest a cluster key arrangement according to the claimed invention.

None of the above inventions and patents, taken either singularly or in combination, is seen to describe the instant invention as claimed.

SUMMARY OF THE INVENTION

The present invention is a cluster key arrangement. The cluster key arrangement may be mechanically configured or electronically configured. The cluster key arrangement may include twelve cluster keys configured in an arrangement of three columns by four rows, such as conventionally found on standard telephones. The cluster key arrangement may also be configured for use on cellular/mobile telephones, television remote controls, other handheld data entry devices, automotive controls, desktop/wall-mounted/cordless telephones, combination telephone recorders, Personal Digital Assistants (PDAs), and other electronic devices. The cluster keys provide a user with the ability to select one of a plurality of key elements representing numbers, letters, symbols, functions, etc., in a mutually exclusive manner.

The mechanical cluster keys each include a primary key and at least one secondary key. The number of secondary keys is preferably in the range of four to eight. The mechanical cluster keys are preferably constructed from material giving a large range of hardness that may be needed to provide positive tactile feedback to the user. The primary key preferably includes a dome or convex shaped button profile further shaped circularly, ellipsoidally, pentagonally, etc., as viewed from the top. The dome or convex shaped primary key profile as it reaches the vicinity of the secondary key assumes a concave profile. While a concave profile may be substituted for a dome, other button shapes, as viewed from the top, such as hexagonal, heptagonal, or octagonal may be substituted. The secondary keys preferably each have a concave profile starting at the perimeter of the primary key somewhat underneath the primary key in elevation and rise up in a concave arcuate profile to increase the contact surface area of the fingertip for better pressure distribution and ends with a greater width such as obtained by the wide end of a trapezoid, for providing a greater width to the finger to act on, and ends at an elevation which is slightly lower than the top elevation of the dome of the primary key, with which it is clustered. Other secondary key profiles, as viewed from the top, may include shapes such as rectangular, trapezoidal, semi-circular, or elongated to provide more finger contact.

The primary keys are each labelled with a number, an asterisk symbol (*), or a pound sign (#). The secondary keys are each labelled with a function designation, letters, or character symbols. Each key has a first portion of the key exposed on a first side of the key cluster, and a second portion and third portion of the key exposed on a second side of the key cluster. When the first portion of a key is depressed by a user, the second portion of the primary key comes into contact with the second portions of the secondary keys with which it is clustered and mechanically mutually excludes any of the corresponding secondary keys' third portions of that particular key cluster from contacting a substrate such as a printed circuit board or an intermediate layer of an elastomeric sheet that has hat like protrusions with attached conductive elements under the hats to complete a circuit upon being depressed. If the primary key is depressed, none of the associated secondary keys may contact the substrate. If a secondary key is depressed preferably neither the associated primary key nor the remaining secondary keys may contact the substrate. It is possible that if a secondary key is depressed, at least two of the immediately adjacent secondary keys will be precluded from acting on the substrate.

One technique for detecting a depressed condition of a key utilizes a capacitive key wherein a key circuit element forms two spaced apart metallic areas and has a plated pad formed from a metal such as tin, nickel, or copper such that when the key end is brought in close proximity to the current element, a capacitive charge is noted by a keypad circuit board and a key-depressed state is acknowledged by a corresponding keyboard microprocessor and logic unit. An alternative construction incorporates a hardcontact keyboard, wherein the key has a stem which directly engages with the concave cavity, in close proximity with a pair of contacts comprising the circuit element which are then brought into electrically communicative relationship therebetween. Such a configuration for use in association would include physical shell caps on a flexible board spaced from a circuit board which includes metallic contacts. The shell caps each include a metallic element within the cap. When a user presses one button of a selected cluster key, a signal is generated when the key bottom of the key presses a shell cap and causes the associated metallic element to contact a metallic contact.

A mechanical cluster key arrangement configured for use on a remote telephone includes a housing, a speaker, and a microphone. The housing also includes a liquid crystal display. Openings in the housing are provided for the individual cluster keys. In addition, the remote telephone may also include a buzzer, indicator lights, and other features, depending upon a particular design or model. The remote telephone includes a main printed circuit board which includes all of the major radio frequency (RF) and logic circuits required to provide at least basic cellular telephone service and support a variety of features. Such circuits typically include a plurality of chips, integrated circuits, and other components interconnected formed within, or on the surface, of the printed circuit board. The remote telephone also includes an antenna that extends through an aperture provided in the housing and is electrically connected to the printed circuit board.

The housing encloses a substrate on which are mounted the closing switches and the dial pulse circuit which is controlled by these switches. Upon reception of RF signals, the mobile telephone receives the RF signals through the antenna. The antenna converts the received RF signals into electrical RF signals for use by the radio circuitry. The radio circuitry demodulates the electrical RF signals and recovers the data transmitted using the RF signals. Additionally, the radio circuitry outputs the data to a processor. The processor includes at least a main processor and associated memory as well as other control circuits including integrated circuits or other known technologies. The processor formats the data output from the radio circuitry into a recognizable voice or message information for use by the user interface. The user interface communicates the received information or voice to a user through the use of the speaker and the display. All digital or all analog or combinations of analog and digital network based cellular telephone services are possible.

Unlike present analog systems and other digital systems that divide the available spectrum into narrow channels and assign one or more conversations to each channel, CDMA is a wideband spread spectrum technology that spreads multiple conversations across a wide segment of the broadcast spectrum. Each telephone or data call is assigned a unique code that distinguishes it from the multitude of calls simultaneously transmitted over the same broadcast spectrum. So long as the receiving device has the right code, it can pick its conversation out from all the others.

Another mechanical cluster key arrangement according to the invention includes cluster keys which each include a primary key circularly surrounded by a concave shaped secondary key. The various possible shapes attributed to the primary and secondary keys in the previously described mechanical cluster key arrangements are also possible in this mechanical cluster key arrangement. The cluster keys in this cluster key arrangement are preferably constructed from material giving a large range of hardness that may be needed to provide positive tactile feedback to the user. As before, typically, the primary keys are each labelled with a number, an asterisk symbol (*), or a pound sign (#). The secondary keys are each labelled with at least one function designation, letter, or character symbol. Each key has a first portion of the key exposed on a first side of the cluster key assembly, and a second and third portion of the key exposed on a second side of the cluster key assembly. When the first portion of a key is depressed by a user, the third portion of the key comes into contact with a substrate while its second portion mechanically mutually excludes any functions associated with the corresponding secondary key of that particular cluster key from contacting the, substrate.

The primary key travels through a stepped hole in the key cluster. When the primary key is actuated, a shoulder on the primary key mates with steps in the secondary keys. This engagement of the shoulder of the primary key with the steps in secondary keys traps the secondary keys against the substrate and prevents them from rotating and rolling over the surface of the substrate. Since the secondary keys are actuated by rotating and rolling over the substrate, the secondary keys can not be actuated when the primary key is actuated.

When a secondary key is actuated by rotating and rolling over the surface of the substrate, it positions the primary key at an) angle with the substrate. If the primary key is then depressed, this angle will cause the edge of the primary key to contact the substrate and prevent the bottom face of the primary key from making contact. Since actuation of the primary key is produced by the bottom face contacting the substrate, this prevents actuation of the primary key when a secondary key is actuated. Each secondary key includes a bottom surface which includes electrical traces corresponding to the number of functions designated on the upper surface of the secondary key. Selection of one function mutually precludes the selection of the other secondary key functions or the primary key function.

An electronic cluster key arrangement comprises a primary key and at least one secondary key and is electronically configured in the form of a transparent a touch screen liquid crystal display (LCD) mounted within a remote telephone which includes a housing, a speaker, and a microphone. Obviously, this electronically configured touch screen LCD cluster key arrangement may also be configured for use on cellular/mobile telephones, television remote controls, other handheld data entry devices, automotive controls, desktop/wall-mounted/cordless telephones, combination telephone recorders, PDAs, and other electronic devices, according to the desires of the user. The cluster keys in this electronic configuration are preferably displayed in the form of circular, ellipsoidal, pentagonal, etc., images as viewed from the top. The secondary keys each preferably displayed in the form of rectangular, trapezoidal; semi-circular, images which may be elongated to provide more finger contact.

The housing also includes a liquid crystal display (LCD) for displaying information for the user, a power switch, and a mode switch. The touch screen LCD may be any conventionally configured touch screen LCD. For example, the touch screen LCD may be configured in the form of an upper glass sheet and a lower glass sheet with a thin layer of liquid crystal material including a pressure sensing element sandwiched between the glass sheets. However, the touch screen LCD may also be configured in combination with a transparent thin film solar cell such as a p-i-n junction type amorphous silicon solar cell.

Many approaches to the determination of the location of X and Y coordinates of a touch point based on sensing pressure are well known. A pressure-sensitive input device comprising an X-coordinate detection resistive element connected to mutually parallel vertical conductors and a Y-coordinate detection resistive element connected to mutually parallel horizontal conductors, for detecting the position of a point depressed by a stylus or the like, works by detecting changes in the resistance values of these resistive elements. Switches are used for on-off control of the current flowing into or out of both ends of the X-coordinate detection resistive element and the Y-coordinate detection resistive element, and a voltage detection circuit detects the voltage between the X-coordinate detection resistive element and the Y-coordinate detection resistive element. Multiple inputs can be detected based on the results from the voltage detection circuit when the currents are switched by the switches.

The preceding is but one approach to pressure sensing based location determination known in the art. A more sensitive "smart sensor" type micro-strain gage based localized point sensor located at the midpoint of the keycaps of the primary keys and at the midpoint of the secondary keycaps, located along the circumference of a circle which constitutes the "virtual circle" along which lie the locus of the centers of the secondary keys of the various embodiments. This sensitive pressure sensor can output an analog pressure level and its digitized digital equivalent and likewise the rate of change of pressure and its digitized equivalent. The sensor is a smart sensor in that it can be embedded in the carrier material.

The first level of mutual exclusivity is rather trivial. The system logic will not accept inputs from two different cluster keys; such dual activation attempt will occur when a user inadvertently presses two adjacent secondary keys belonging to two different clusters (the system will output an error message and sound a beep asking the user to move the finger a little closer to the center of the cluster). It can also occur when one purposely tests the system by pressing keys from clusters that are not adjacent (this will merely elicit a beep and optionally display an error message).

Once the finger is operating within a cluster, the finger perhaps overlaps a little over let us say 3 keys . . . . The intended secondary key (let us say the alphabet B), the corner of the primary key (which is the number 2) and a portion of the adjacent secondary key (say the letter A) . . . under these circumstances, the pressure sensor that is distributed over the entire "keycap" areas of both the secondary keys and the primary key will generate a logical YES for these keys. However, the more sensitive pressure sensor located in the middle (lower threshold) will in most instances have an output only in the intended secondary key of B. This output in reality has two components, an analog level (or its digitized equivalent) representing the amount of or relative amount of pressure (this is likely to be the highest in the intended secondary key since presumably the finger tip is acting on it. For further reliability, a rate input will also be generated in identical fashion. When uniqueness is established the logical outputs from the other two keys are precluded from proceeding further. A simple implementation would accomplish this inside the box with conventional electronics. It is also possible to implement this in a solid state or monolithic way by opening the conductive pathway from the non intended keys thus making it mutually exclusive.

A second pressure sensor, i.e., the generalized or entire keycap based pressure sensor also needs to be there for another case, i.e. when one attempts to provide a very clean input by using a pen tip or stylus as is done on palmtop PDAs these days. This capability falls under the realm of user friendliness, since there are many users who use this method currently, albeit with a complaint. Of course they are doing it because they have no choice.

The touch screen LCD could be of the monochromatic type or an active matrix full color display. As is known widely to those skilled in the art, an active matrix generally consists of two sheets between which is inserted an electro-optical material such as a liquid crystal. On one of the sheets is a matrix of transparent conductive blocks, thin film transistors, a group of conducting addressing lines, and a group of conductive addressing columns. Each transistor has a gate connected to a line, a source connected to a block, and a drain connected to a column. On the second sheet is a counter electrode. In one electronic cluster keys arrangement, on top of the liquid crystal material is attached a flexible transparent film which has patterned thin film semiconductor layers preferably comprising a layer of i(intrinsic) -type semiconductor disposed between a layer of p-type semiconductor and a layer of n-type semiconductor. The p-i-n layer is further sandwiched on either side by a thin layer of transparent conductive layer such as tin oxide, indium tin oxide, or the like, to constitute a p-i-n junction amorphous silicon solar cell.

A silicon solar cell connected to the emitter of a common base amplifier biased so that the cell voltage is near to zero, a short-circuit load can be used as a sensor. Collector load is three forward diodes which develop an approximately logarithmic voltage versus current in the current ranges involved. The next stage provides the alternating current (AC) coupling for the pulses, so that the sensitivity of the sensing system is essentially independent of the light level on the cell. This stage is an operational amplifier with a bypass on the feedback for high AC gain and low direct current (DC) gain. This network also has a low-pass net to reject noise spikes picked up from the environment. The coverage of the conductive layers by an actuating finger causes shadowing which results in a decreased current output proportional to the area shadowed.

The p-i-n junction amorphous silicon solar cell is scribed, preferably using a laser scriber, into smaller portions comprising one primary portion and at least one peripheral secondary portion (preferably four secondary portions around the primary portion) t configure an electronic cluster key. The p-i-n junction amorphous silicon solar cell include at least one vertical and horizontal grid of transparent conductors laid in between two transparent insulating layers of the thin film variety such as silicon dioxide. The p-i-n junction amorphous silicon solar cell's two conductive transparent coatings of tin oxide, indium tin oxide, or the like, can be combined in series using techniques well known to persons skilled in the art to provide a trickle charge at approximately 12–14 volts. One approach to series connection entails using a laser to scribe and separate the initial tin oxide coating into islands, using a photoresist mask on the edge to prevent the subsequent layers of p-type, i-type, and n-type semiconductors from touching the conductive layer. Thereafter, the mask is removed and the second tin oxide layer is applied which connects the top, surface of the second cell to the bottom surface of the first cell, resulting in a series connection. Other intervening steps are well known to those versed in the art. The p-i-n junction amorphous silicon solar cell may include capacitors and/or pressure sensors at the center of each key which are all deposited on a flexible transparent substrate such as Kapton and then glued on to the LCD. Kapton or other high temperature plastic is used to withstand high temperatures associated with chemical vapor deposition of amorphous silicon. It is possible to integrate the processing of the solar cell and the touch screen LCD based on active matrix thin film transistors (TFTs).

The touch screen LCD is preferably an active matrix TFT display which preferably displays the primary keys as white key with black characters for most contrast and which preferably displays secondary key alphabet characters in a particular color such as red. Preferably secondary key function symbols are displayed in green, secondary key characters such as the AT sign (@) are displayed in blue, and secondary key control symbols such as YES/SEND are displayed in yellow with green letters and NO/END are displayed in yellow with red letters. Obviously, a variety of other color assignments are possible.

The electronic cluster key arrangement is configured utilizing a keyboard emulator within the remote telephone in accordance with the mode selected by the user using the mode switch. One arrangement showing an electronic cluster key arrangement comprises a set of twelve cluster keys arranged in four rows by three columns. Each electronically configured cluster key includes a primary key location surrounded by at least one secondary key location. By touching a particular key location on the touch screen LCD, the user activates an electrical signal which passes through an electrical matrix formed by a plurality of contact lines interconnecting each of the particular key locations. The electrical signal is delivered to a processing unit stored within the remote telephone, which is then converted into a symbol and displayed on the LCD. The remote telephone also includes circuitry which precludes the simultaneous activation of more than one key location of a particular cluster key.

The electronic or opto-electronic mutually exclusive cluster key arrangement works on the same basis of preprocessing as was done in the mechanical cluster key arrangements wherein only one signal could be generated at a time. In the electronic cluster key arrangement the preprocessing is based on sensing one or more variables such as contact pressure or shadowing of a solar cell's microcell element. Both analog levels and digital/logical inputs are used in preprocessing. Other types of sensing such as capacitive is also possible. Appropriate grid work of conductors and electronics which is well known to those skilled in the art will be used, entailing the use of digital and analog mutiplexers, operational amplifiers polling elements and the like. In a pure LCD cluster key arrangement, wherein a pressure sensor alone is the sensing element, in the trivial case where one uses a stylus, such as is done in the use of PDAs currently available in the market the sensing and interpretation is easy. These preceding devices do not work with fingers reliably since the keycaps are too small.

In the present invention, since there is a certain amount of shared "real estate" due to clustering, the user is intentionally allowed to press part of an adjacent key (principally the primary key while pressing a secondary key). The present invention utilizes a distributed or wide area logical pressure sensor alone which provides a logical YES output for a selected positional area, or a low threshold central pressure sensor in combination with other detected readings such as an applied pressure, applied pressure rate, or shadowing. However, the pressure sensing area is mostly in a restricted smaller area around the center. The centers of the adjacent keys are located far enough apart that they result in one or more different levels of pressure generated by a pressing finger. The key associated with the higher level is selected as representing the fingertip which better represents the intended key. In the embodiment with the solar cell, the pressing of a key generates both an analog signal representing the amount of shadowing of a key cap by a operating finger and a digital/logical output which are used in preprocessing singly or in combination with the outputs from the pressure sensor. One approach involves picking for comparison of the shadowing levels only those keys whose pressure sensors have generated a logical YES and simultaneously picking for comparison of the pressure levels only those keys whose shadowing has generated a logical YES. In this scheme of preprocessing, at any stage upon identifying a reliable output such as by the use of a logical AND of the pressure and shadow/solar cell sensors further processing is stopped. The early and reliable identification of an input precludes the activation or consideration of another input in this mutually exclusive electronic cluster key arrangement.

The invention is believed to reside in the cluster key per se, the various arrangements thereof, the combination of known electronic circuitry, and the overall combination of cooperating telephones, PDAs or the like including the Internet at large. Furthermore, the invention may be easily implemented in a manner that is compatible with the existing prior art in terms of user friendliness, such as allowing a user to operate a device in a numeric mode, an alphabetic mode, or the like.

Accordingly, it is a principal object of the invention to provide a cluster key arrangement that enables a user to select one of a plurality of characters representing numbers, letters, symbols, functions, etc., in a mutually exclusive manner.

It is another object of the invention to provide a cluster key arrangement in a mechanical configuration.

It is yet another object of the invention to provide a cluster key arrangement in an electronic configuration.

It is a further object of the invention to provide a mobile telephone having a touch screen LCD with an electronic cluster key Still another object of the invention is to provide a mobile or palmtop computer based Personal. Digital Assistant having a color touch screen LCD with electronic cluster keys with various configurations as chosen by the user with built-in functions of a cellular telephone resulting in a combination cellphone/PDA that has a bigger display area without exceeding the overall dimensions and which provides for a longer talk/useage time per battery charge.

It is an object of the invention to provide improved elements and arrangements thereof in a mechanical or electronic cluster key arrangement for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 6A is a substrate electrical contact for the mechanical cluster key shown in FIG. 4 in accordance with the present invention.

FIG. 6B is a cross-sectional view of the substrate electrical contact shown in FIG. 6A.

Similar reference characters denote corresponding features consistently throughout the attached drawings.

DETAILED DESCRIPTION OF THE PREFERRED EMBODIMENTS

Figure 1:
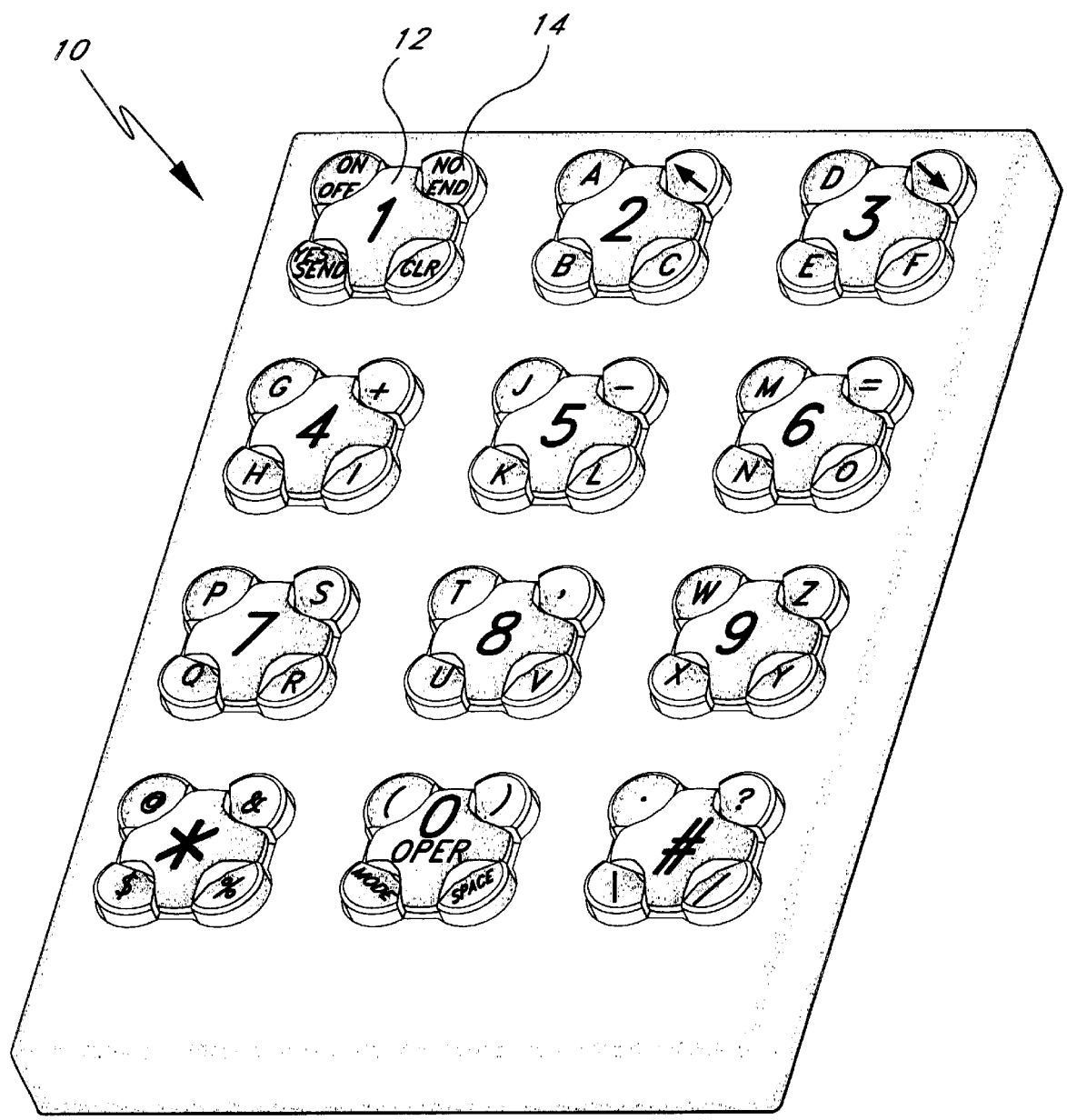
FIG. 1 is a front perspective view of a cluster key arrangement according to the present invention.

The present invention is a cluster key arrangement. The cluster key arrangement may be mechanically configured or electronically configured. A mechanical cluster key arrangement according to the invention is shown in FIG. 1. This mechanical cluster key arrangement 10 includes twelve cluster keys configured in an arrangement of three columns by four rows, such as conventionally found on standard telephones. This cluster key arrangement 10 may also be configured for use on cellular/mobile telephones, television remote controls, other handheld data entry devices, automotive controls, desktop/wall-mounted/cordless telephones, combination telephone recorders, PDAS, and other electronic devices. The cluster keys provide the user with the ability to select one of a plurality of key elements representing numbers, letters, symbols, functions, etc., in a mutually exclusive manner.

The cluster keys shown in FIG. 1 each include a primary key 12 surrounded by four secondary keys 14. However, a cluster key arrangement according to the invention may obviously include a primary key and any number of secondary keys, i.e., one, two, three, etc. The number of secondary keys is preferably in the range of four to eight. The cluster keys are preferably constructed from material giving a large range of hardness that may be needed to provide positive tactile feedback to the user. The primary key 12 for a particular cluster key preferably includes a dome or convex shaped button profile further shaped circularly, ellipsoidally, pentagonally, etc., as viewed from the top. The dome or convex shaped primary key profile as it reaches the vicinity of the associated secondary keys 14 assumes a concave profile. While a concave profile may be substituted for a dome, other button shapes, as viewed from the top, such as hexagonal, heptagonal, or octagonal may be substituted. The secondary keys 14 preferably each have a concave profile starting at the perimeter of the primary key somewhat underneath the primary key 12 in elevation and rises up in a concave arcuate profile to increase the contact surface area of the fingertip for better pressure distribution and ends with a greater width such as obtained by the wide end of a trapezoid, for providing a greater width to the finger to act on, and ends at an elevation which is slightly lower than the top elevation of the dome of the primary key 12, with which it is clustered. Other secondary key profiles, as viewed from the top, may include shapes such as rectangular, trapezoidal, semi-circular, which may be elongated to provide more finger contact.

The primary keys 12 are each labelled with a number, an asterisk symbol (*), or a pound sign (#). The secondary keys 14 are preferably nominally small in relation to the associated primary key 12 to accommodate space constraints. The secondary keys 14 preferably each include an arcuate concave surface which increases the surface area of contact for better pressure distribution at the finger tip of the user. Preferably, the outer edge of the secondary keys 14 flares out to provide a greater width on which a finger may act. The secondary keys 14 are each labelled with a function designation, letters, or character symbols.

Each primary key 12 has a first portion of the key exposed on a first side of the associated key cluster, and a second portion and third portion of the key exposed on a second side of the key cluster. When the first portion of a primary key 12 is depressed by a user, the second portion of the primary key 12 comes into contact with the second portions of the associated secondary keys with which it is clustered and mechanically mutually excludes any of the corresponding secondary keys third portions of that particular key cluster from contacting a substrate such as a printed circuit board or an intermediate layer of an elastomeric sheet that has hat like protrusions with attached conductive elements under the hats to complete a circuit upon being depressed. If the primary key 12 of a cluster key is depressed, none of the associated secondary keys may contact the substrate. If a secondary key of a cluster key is depressed preferably neither the associated primary key nor the remaining associated secondary keys may contact the substrate. It is possible that if a secondary key is of a cluster key is depressed, at least two of the immediately adjacent secondary keys will be precluded from acting on the substrate.

Figure 4:
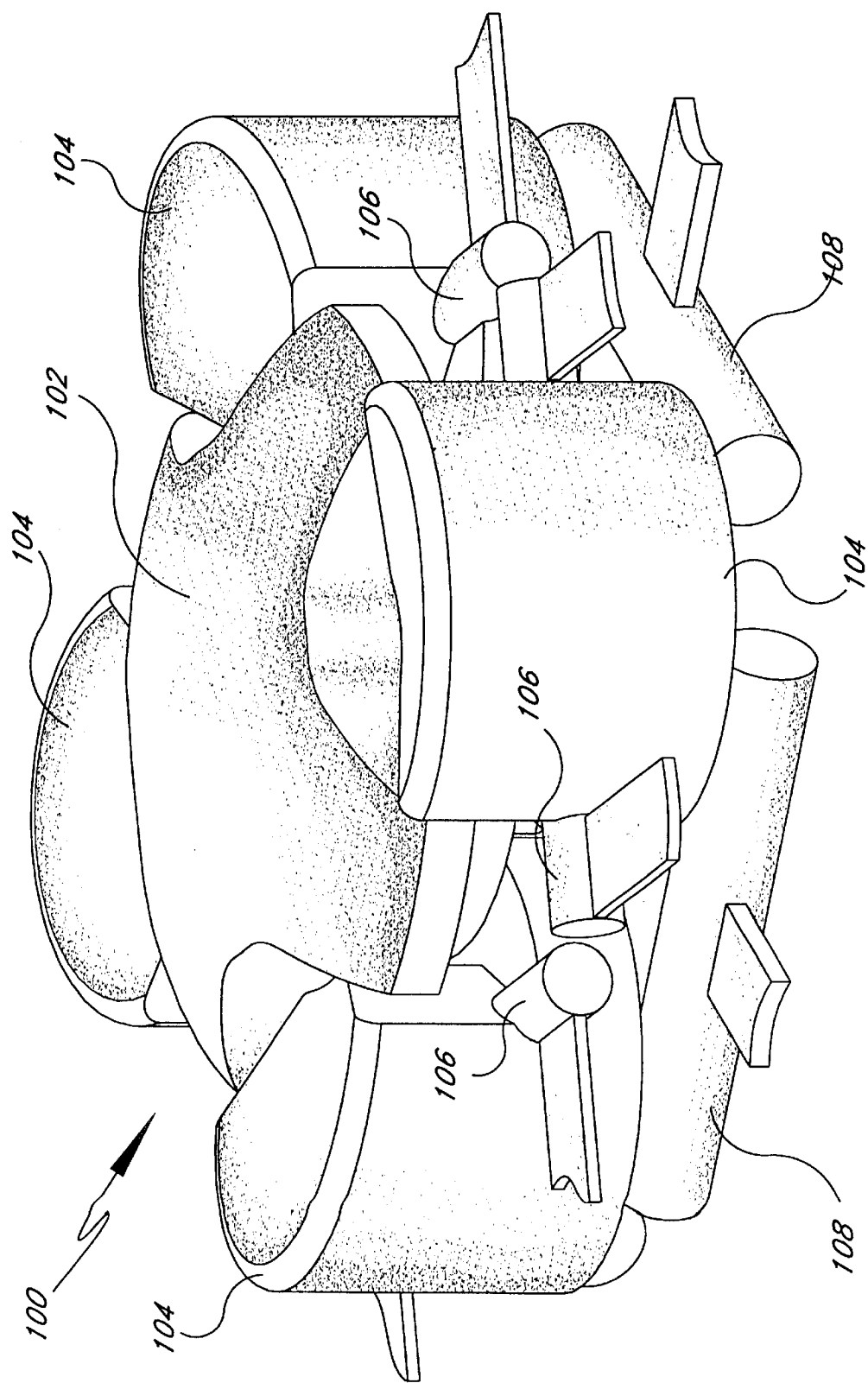
FIG. 4 is a side perspective view of a mechanical cluster key according to the present invention.
Figure 5:
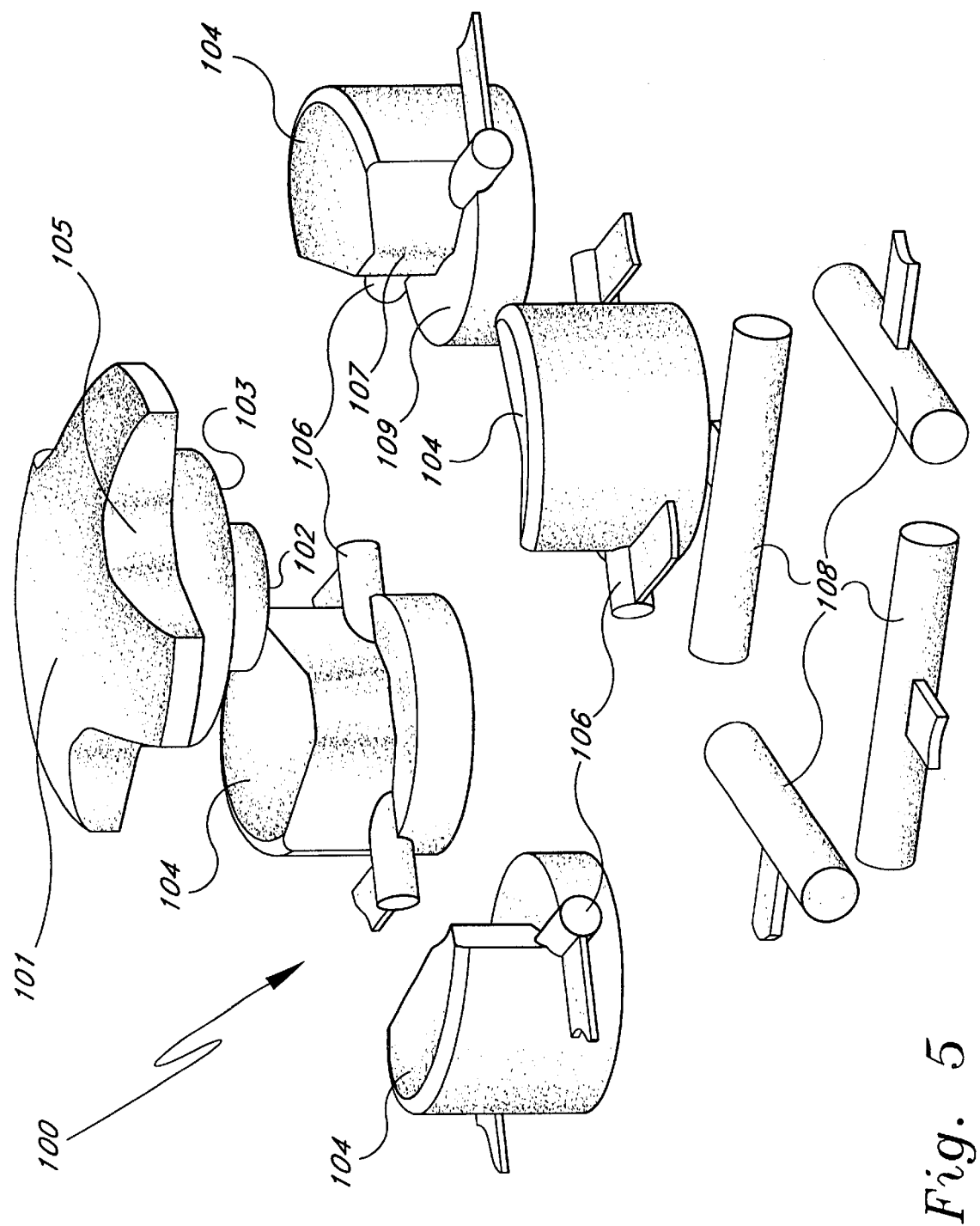
FIG. 5 is an exploded view of the mechanical cluster key shown in FIG. 4.

A perspective view and an exploded view of one of these key clusters 100 is shown in FIGS. 4 and 5, wherein a primary key 101 is surrounded by four secondary keys 104 that each pivot about a pivot axis 106. As shown, the primary key 101 includes a first portion of the key exposed on a first side of the associated key cluster, and a second portion 103 and third portion 102 of the key exposed on a second side of the key cluster. If the primary key 101 of the cluster key is depressed, none of the associated secondary keys 104 may contact the substrate. If a secondary key 104 of the cluster key is depressed neither the associated primary key 101 nor preferably the remaining associated secondary keys 104 may contact the substrate, since secondary key mutual exclusivity actuator 108 precludes it. However, it is possible to mechanically configure a cluster key arrangement wherein two secondary keys of a particular cluster key may be simultaneously depressed. In that case a processor operating in conjunction with the cluster key arrangement would not generate a signal in response to such activity, and may generate a error signal to the user.

One technique for detecting a depressed condition of a key utilizes a capacitive key wherein a key circuit element forms two spaced apart metallic areas and one key and has a plated pad formed from a metal such as tin, nickel, or copper such that when the key end is brought in close proximity to the current element, a capacitive charge is noted by a keypad circuit board and a key-depressed state is acknowledged by a corresponding keyboard microprocessor and logic unit. An alternative construction incorporates a hardcontact keyboard, wherein the key has a stem which directly engages with the concave cavity, in close proximity with a pair of contacts comprising the circuit element which are then brought into electrically communicative relationship therebetween. As shown in FIGS. 6A and 6B, such a configuration for use in association with the cluster key shown in FIGS. 4 and 5 include physical shell caps 160 on a flexible board 158 spaced from a circuit board 164 which includes metallic contacts 166. The shell caps 160 each include a metallic element 162 within the cap 160. When a user presses one button of a selected cluster key, a signal is generated when the key bottom of the key presses a shell cap 160 and causes the associated metallic element 162 to contact a metallic contact 166.

Figure 2:
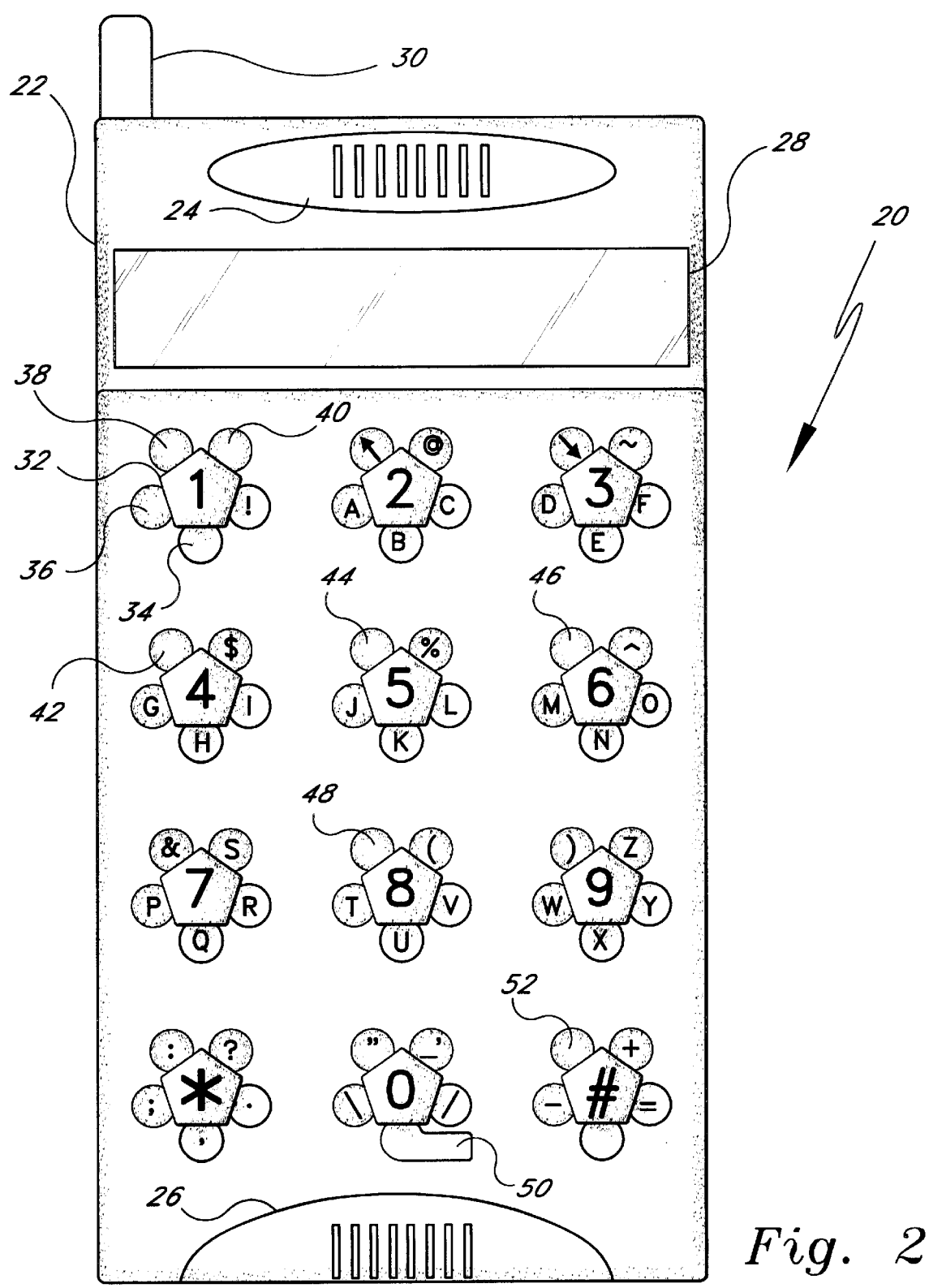
FIG. 2 is a top view of a mechanical cluster key arrangement according to the present invention configured in the form of a telephone.

A mechanical cluster key arrangement configured for use on a remote telephone 20 is shown in FIG. 2 which includes a housing 22, a speaker 24, and a microphone 26. The housing 22 also includes a liquid crystal display (LCD) 28. Openings in the housing are provided for the individual cluster keys. In addition, although not shown, the remote telephone 20 may also include a buzzer, indicator lights, and other features, depending upon a particular design or model. The remote telephone 20 includes a main printed circuit board (not shown) which includes all of the major radio frequency (RF) and logic circuits required to provide at least basic cellular telephone service and support a variety of features. Such circuits typically include a plurality of chips, integrated circuits, and other components interconnected formed within, or on the surface, of the printed circuit board.

The remote telephone 20 also includes an antenna 30 that extends through an aperture provided in the housing 22 and is electrically connected to the printed circuit board. The housing 22 encloses a substrate on which are mounted the closing switches and the dial pulse circuit which is controlled by these switches. Upon reception of RF signals, the mobile telephone 20 receives the RF signals through the antenna 30. The antenna 30 converts the received RF signals into electrical RF signals for use by the radio circuitry. The radio circuitry demodulates the electrical RF signals and recovers the data transmitted using the RF signals. Additionally, the radio circuitry outputs the data to a processor. The processor includes at least a main processor and associated memory as well as other control circuits including integrated circuits or other known technologies. The processor formats the data output from the radio circuitry into a recognizable voice or message information for use by the user interface. The user interface communicates the received information or voice to a user through the use of the speaker 24 and the display 28. All digital or all analog or combinations of analog and digital network based cellular telephone services are possible.

Unlike present analog systems and other digital systems that divide the available spectrum into narrow channels and assign one or more conversations to each channel, CDMA is a wideband spread spectrum technology that spreads multiple conversations across a wide segment of the broadcast spectrum. Each telephone or data call is assigned a unique code that distinguishes it from the multitude of calls simultaneously transmitted over the same broadcast spectrum. So long as the receiving device has the right code, it can pick its conversation out from all the others.

The mechanical cluster keys shown in FIG. 2 each include a primary key 32 and five secondary keys. As stated before, a cluster key arrangement according to the invention may obviously include a primary key and any number of secondary keys, i.e., one, two, three, etc. The selected number of secondary keys is preferably in the range of four to eight. The cluster keys are preferably constructed from material giving a large range of hardness that may be needed to provide positive tactile feedback to the user. The primary key 32 for a particular cluster key preferably includes a dome or convex shaped button profile further shaped circularly, ellipsoidally, pentagonally, etc., as viewed from the top. The dome or convex shaped primary key profile as it reaches the vicinity of the associated secondary keys assumes a concave profile. While a concave profile may be substituted for a dome, other button shapes, as viewed from the top, such as hexagonal, heptagonal, or octagonal may be substituted. The associated secondary keys each preferably have a concave profile starting at the perimeter of the primary key somewhat underneath the primary key in elevation and rises up in a concave arcuate profile to increase the contact surface area of the fingertip for better pressure distribution and ends with a greater width such as obtained by the wide end of a trapezoid, for providing a greater width to the finger to act on, and ends at an elevation which is slightly lower than the top elevation of the dome of the primary key, with which it is clustered. Other secondary key profiles, as viewed from the top, may include shapes such as rectangular, trapezoidal, semi-circular, which may be elongated to provide more finger contact.

The primary keys 32 are each labelled with a number, an asterisk symbol (*), or a pound sign (#) The secondary keys are each labelled with a function designation, letters, or character symbols. In this mechanical cluster key arrangement, the primary key labelled "1" is surrounded by unmarked secondary keys 34,36,38,40 and a secondary key labelled with "!". While the secondary keys 34,36,38,40 may obviously be labelled according to the desires of the user, preferably secondary key 34 is labelled "CLR", secondary key 36 is labelled "YES/SEND", secondary key 38 is labelled "PWR ON/OFF", and secondary key 40 is labelled "NO/END". Each key is disposed within the housing. The primary key labelled "4" includes an unmarked secondary key 42 which is preferably labelled "CTRL". The primary key labelled "5" includes an unmarked secondary key 44 which is preferably labelled "ALT". The primary key labelled "6" includes an unmarked secondary key 46 which is preferably labelled "ENTER". The primary key labelled "8" includes an unmarked secondary key 48 which is preferably labelled with an accent mark. The primary key labelled "0" includes an unmarked secondary key 50 which is preferably labelled "SPACE BAR". The primary key labelled "#" includes an unmarked secondary key 52 which is preferably labelled with an underscore. The primary key labelled "#" also includes another unnumbered unmarked secondary key which is preferably labelled "MODE". Each key has a first portion of the key exposed on a first side of the housing and a second portion of the key exposed on a second side of the housing. When the first portion of a key is depressed by a user, the second portion of the key comes into contact with a substrate and mechanically mutually excludes any of the corresponding keys of that particular key cluster from contacting the substrate. These cluster keys function in the same manner as the cluster key shown in FIGS. 4 and 5, wherein a primary key is surrounded by secondary keys which pivot about a pivot axis. If the primary key of a cluster key is depressed, none of the associated secondary keys may contact the substrate. If a secondary key of a cluster key is depressed preferably neither the associated primary key nor the remaining associated secondary keys may contact the substrate. It is possible that if a secondary key of a cluster key is depressed, at least two of the immediately adjacent secondary keys will be precluded from acting on the substrate on account of secondary key mutual exclusivity actuator 108.

One technique for detecting a depressed condition of a key utilizes a capacitive key wherein the key circuit element forms two spaced apart metallic areas and has a plated pad formed from a metal such as tin, nickel, or copper such that when the key end is brought in close proximity to the current element, a capacitive charge is noted by the circuit board and a key-depressed state is acknowledged by a corresponding keyboard microprocessor and logic unit. An alternative construction incorporates a hardcontact keyboard, wherein the key has a stem which directly engages with the concave cavity, in close proximity with a pair of contacts comprising the circuit element which are then brought into electrically communicative relationship therebetween, previously described.

Figure 3:
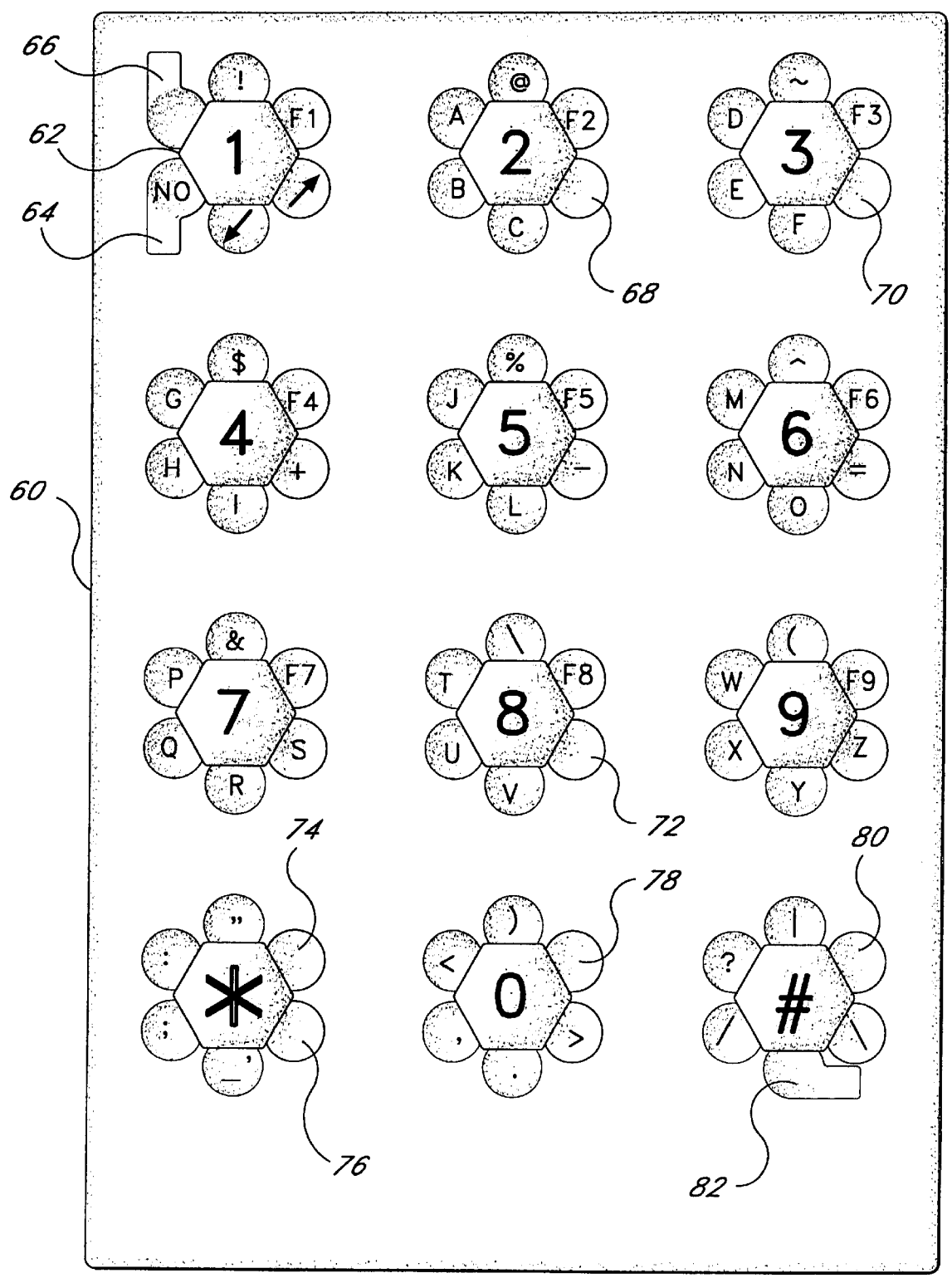
FIG. 3 is a top view of a mechanical cluster key arrangement according to the present invention.

Another mechanical cluster key arrangement 60 according to the invention is shown in FIG. 3. The cluster keys in this cluster key arrangement 60 each include a primary key 62 surrounded by six secondary keys. As stated above, a cluster key arrangement according to the invention may obviously include a primary key and any number of secondary keys, i.e., one, two, three, etc. The number of secondary keys is preferably in the range of four to eight. The cluster keys are preferably constructed from material giving a large range of hardness that may be needed to provide positive tactile feedback to the user. The primary key for a particular cluster key preferably includes a dome or convex shaped button profile further shaped circularly, ellipsoidally, pentagonally, etc., as viewed from the top. The dome or convex shaped primary key profile as it reaches the vicinity of the associated secondary keys assumes a concave profile. While a concave profile may be substituted for a dome, other button shapes, as viewed from the top, such as hexagonal, heptagonal, or octagonal may be substituted. The secondary keys each have a concave profile starting at the perimeter of the primary key somewhat underneath the primary key in elevation and rises up in a concave arcuate profile to increase the contact surface area of the fingertip for better pressure distribution and ends with a greater width such as obtained by the wide end of a trapezoid, for providing a greater width to the finger to act on, and ends at an elevation which is slightly lower than the top elevation of the dome of the primary key, with which it is clustered. Other secondary key profiles, as viewed from the top, may include shapes such as rectangular, trapezoidal, semicircular, which may be elongated to provide more finger contact. The primary keys 62 are each labelled with a number, an asterisk symbol (*), or a pound sign (#). The secondary keys are each labelled with a function designation, letters, or character symbols. Each key is disposed within the housing. In this cluster key arrangement, the primary key 62 labelled "1" is surrounded by unmarked secondary keys 64,66. While the secondary keys 64,66 may obviously be labelled according to the desires of the user, preferably secondary key 64 is labelled "NO/END", and secondary key 66 is labelled "YES/SEND". The primary key labelled "2" includes an unmarked secondary key 68 which is preferably labelled "MODE". The primary key labelled "3" includes an unmarked secondary key 70 which is preferably labelled "ENTER". The primary key labelled "8" includes an unmarked secondary key 72 which is preferably labelled "ALT". The primary key labelled "*" includes an unmarked secondary key 74 which is preferably labelled "F10". The primary key labelled "*" also includes an unmarked secondary key 76 which is preferably labelled "CTRL". The primary key labelled "0" includes an unmarked secondary key 78 which is preferably labelled "F11". The primary key labelled "#" includes an unmarked secondary key 80 which is preferably labelled "F12". The primary key labelled "#" also includes an unmarked secondary key 82 which is preferably labelled "SPACE BAR". The primary key labelled "#" also includes another unnumbered unmarked secondary key which is preferably labelled "MODE". Each key has a first portion of the key exposed on a first side of the housing and a of the key exposed on a second side of the housing. When the first portion of a key is depressed by a user, the of the key comes into contact with a substrate and mechanically mutually excludes any of the corresponding keys of that particular key cluster from contacting the substrate. These cluster keys function in the same manner as the cluster key shown in FIGS. 4 and 5, wherein a primary key is surrounded by secondary keys which each pivot about a pivot axis. If a primary key 62 is depressed, none of the secondary keys associated with that key cluster may contact the substrate. If a secondary key is depressed neither the primary key nor the remaining secondary keys may contact the substrate.

One technique for detecting a depressed condition of a key utilizes a capacitive key wherein a key circuit element forms two spaced apart metallic areas and one key and has a plated pad formed from a metal such as tin, nickel, or copper such that when the key end is brought in close proximity to the current element, a capacitive charge is noted by a keypad circuit board and a key-depressed state is acknowledged by a corresponding keyboard microprocessor and logic unit. An alternative construction incorporates a hardcontact keyboard, wherein the key has a stem which directly engages with the concave cavity, in close proximity with a pair of contacts comprising the circuit element which are then brought into electrically communicative relationship therebetween.

Figure 7:
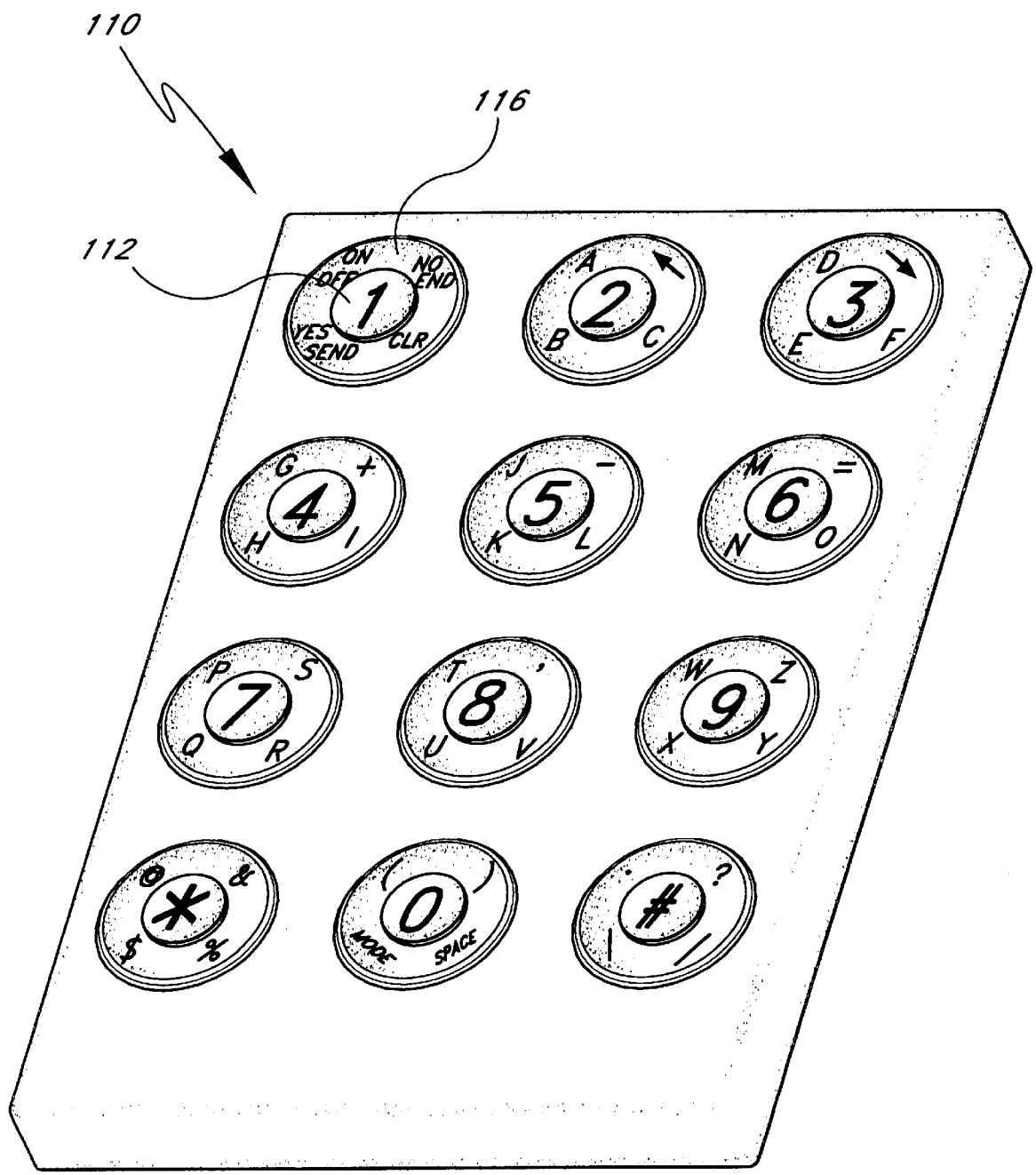
FIG. 7 is a front perspective view of a mechanical cluster key arrangement according to the present invention.
Figure 8A:
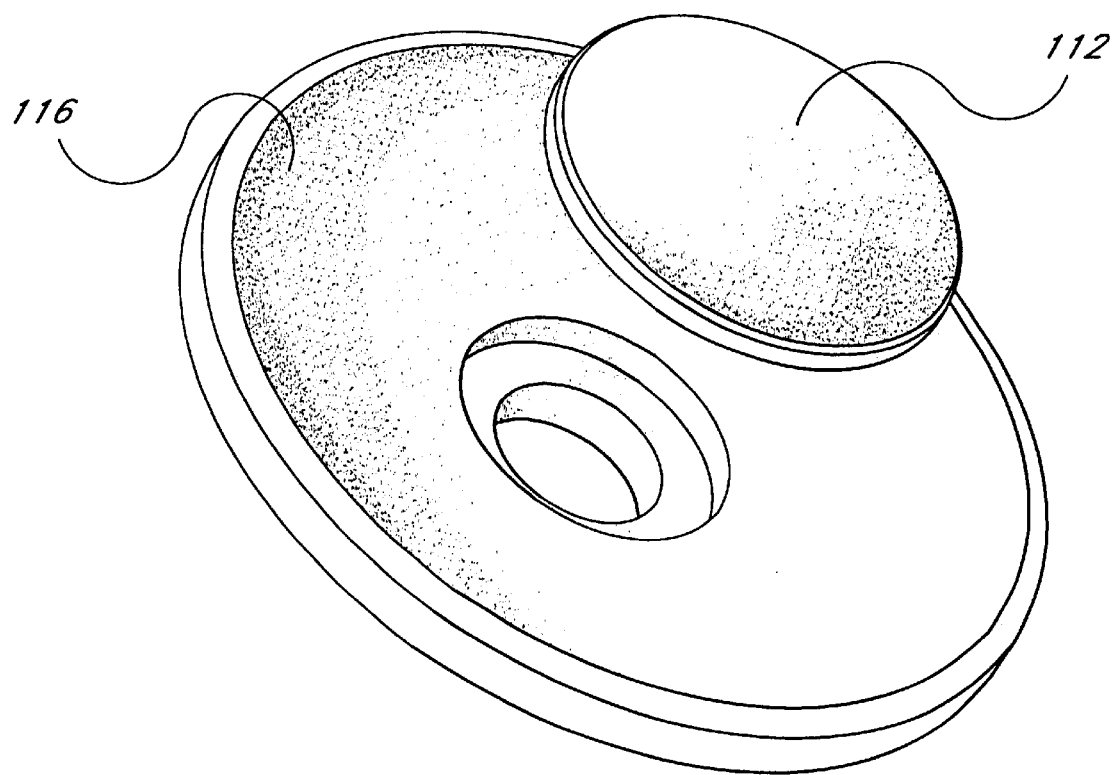
FIG. 8A is an exploded perspective view of a cluster key from the cluster key arrangement shown in FIG. 7.
Figure 8B:
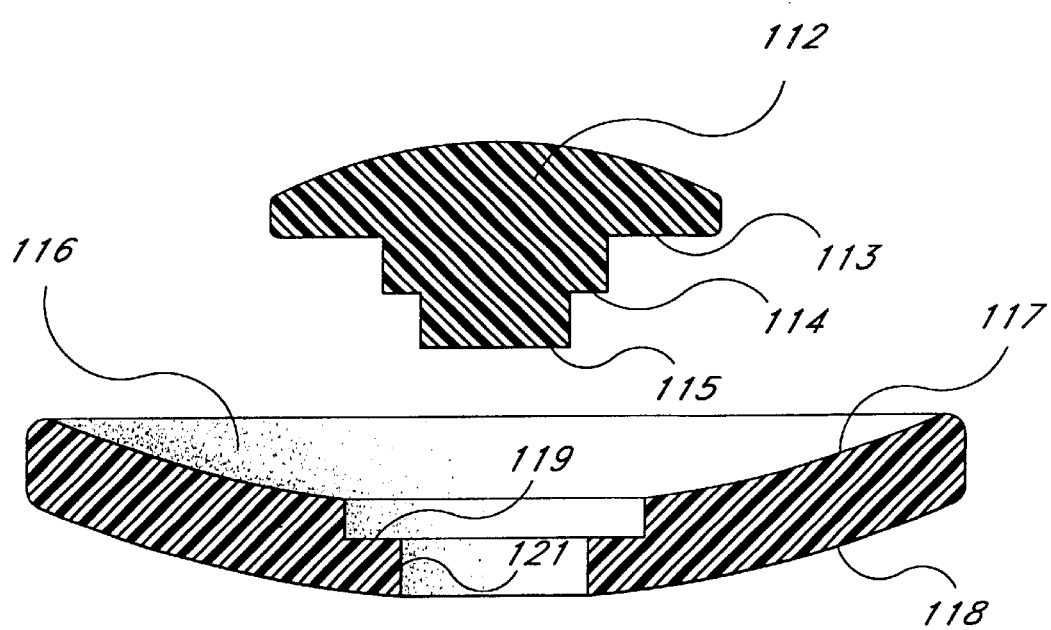
FIG. 8B is a cross-sectional view of the cluster key shown in FIG. 8A.
Figure 9:
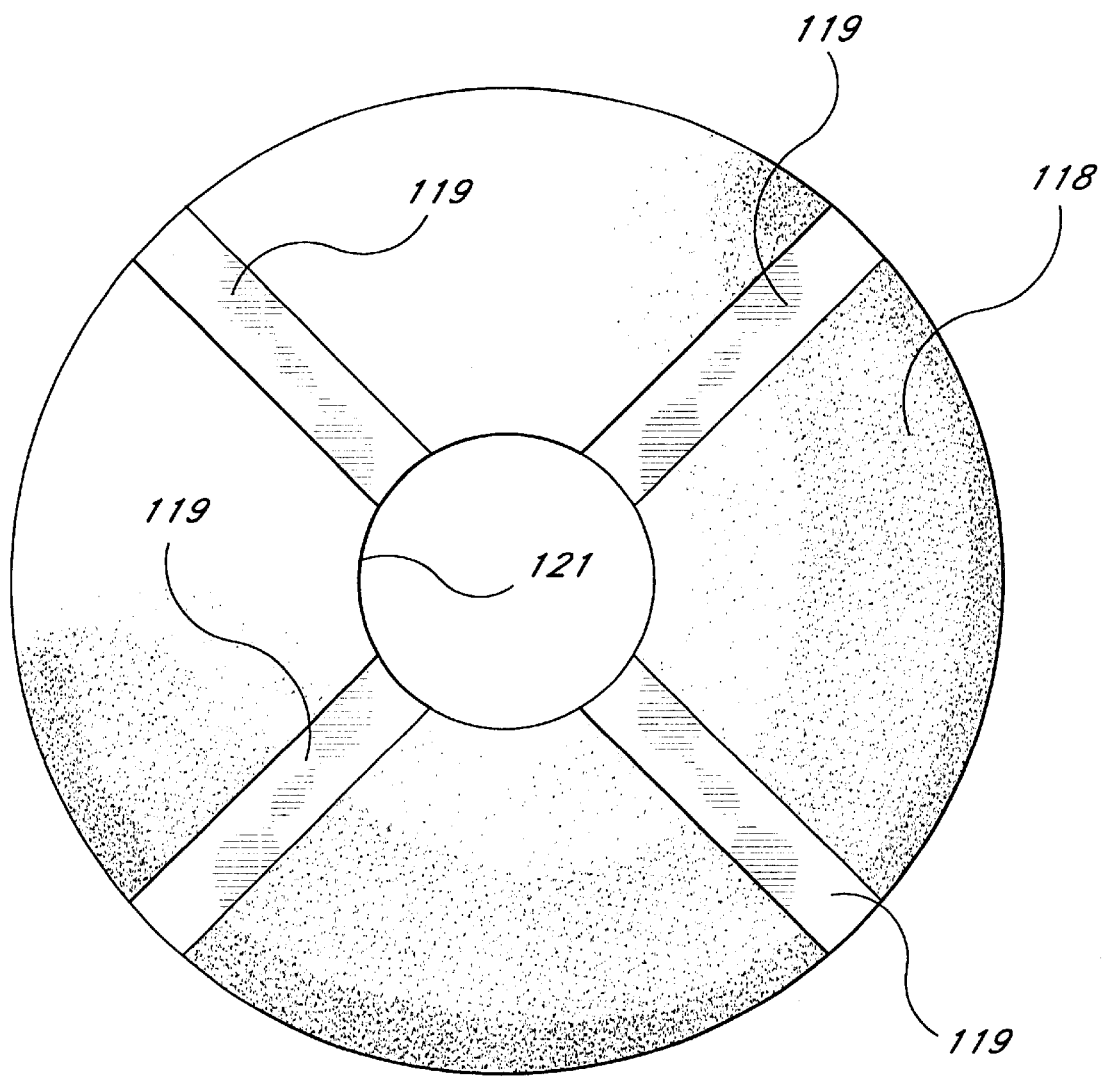
FIG. 9 is a bottom view of the cluster key shown in FIG. 8A.

Another mechanical cluster key arrangement 110 according to the invention is shown in FIG. 7. The cluster keys in this cluster key arrangement 110 each include a primary key 112 circularly surrounded by a concave shaped secondary key 116, as more particularly shown in FIGS. 8A, 8B, and 9. The various possible shapes attributed to the primary and secondary keys in previously described mechanical cluster key arrangements are also possible in this mechanical cluster key arrangement. The cluster keys in this mechanical cluster key arrangement are preferably constructed from material giving a large range of hardness that may be needed to provide positive tactile feedback to the user. As before, typically, the primary keys 112 are each labelled with a number, an asterisk symbol (*), or a pound sign (#). The secondary keys 116 are each labelled with at least one function designation, letter, or character symbol. Each key has a first portion of the key exposed on a first side of the cluster key assembly 110 and a of the key exposed on a second side of the cluster key assembly 110. When the first portion of a key is depressed by a user, the of the key comes into contact with a substrate and mechanically mutually excludes any functions associated with the corresponding secondary key of that particular key cluster from contacting the substrate. If a primary key 112 is depressed, the secondary key 116 associated with that key cluster may contact the substrate. If a secondary key 116 is depressed the primary key 112 may not contact the substrate. As shown in FIG. 9, each secondary key 116 includes a convex bottom surface 118 which includes electrical traces 119 corresponding to the number of functions designated on the concave upper surface 117 of the secondary key 116. Selection of one function mutually precludes the selection of the other secondary key functions or the primary key 112 function.

One technique for detecting a depressed condition of a key utilizes a capacitive key wherein a key circuit element forms two spaced apart metallic areas and has a plated pad formed from a metal such as tin, nickel, or copper such that when the key end is brought in close proximity to the current element, a capacitive charge is noted by a keypad circuit board and a key-depressed state is acknowledged by a corresponding keyboard microprocessor and logic unit. An alternative construction incorporates a hardcontact keyboard, wherein the key has a stem which directly engages with the concave cavity, in close proximity with a pair of contacts comprising the circuit element which are then brought into electrically communicative relationship therebetween.

Each key has a first portion of the key exposed on a first side of the cluster key assembly, and a second and third portion of the key exposed on a second side of the cluster key assembly. When the first portion of a key is depressed by a user, the third portion of the key comes into contact with a substrate while its second portion mechanically mutually excludes any functions associated with the corresponding secondary key of that particular key cluster from contacting the substrate.

The primary key 112 travels through a stepped hole in the key cluster. When the primary key 112 is actuated, a shoulder 114 on the primary key 112 mates with steps 119 in the associated secondary key 116. This engagement of the shoulder 114 of the primary key 112 with steps in the secondary key 116 traps the secondary key 116 against the substrate and prevents it from rotating and rolling over the surface of the substrate. Since the secondary key 116 is actuated by rotating and rolling over the substrate, the secondary key 116 can not be actuated when the primary key 112 is actuated.

When a secondary key 116 is actuated by rotating and rolling over the surface of the substrate, it positions the associated primary key 112 at an angle with the substrate. If the associated primary key 112 is then depressed, this angle will cause the edge of the primary key 112 to contact the substrate and prevent the bottom face 115 of the primary key 112 from making contact. Since actuation of the primary key 112 is produced by the bottom face 115 contacting the substrate, this prevents actuation of the primary key 112 when the associated secondary key 116 is actuated.

Figure 10A:
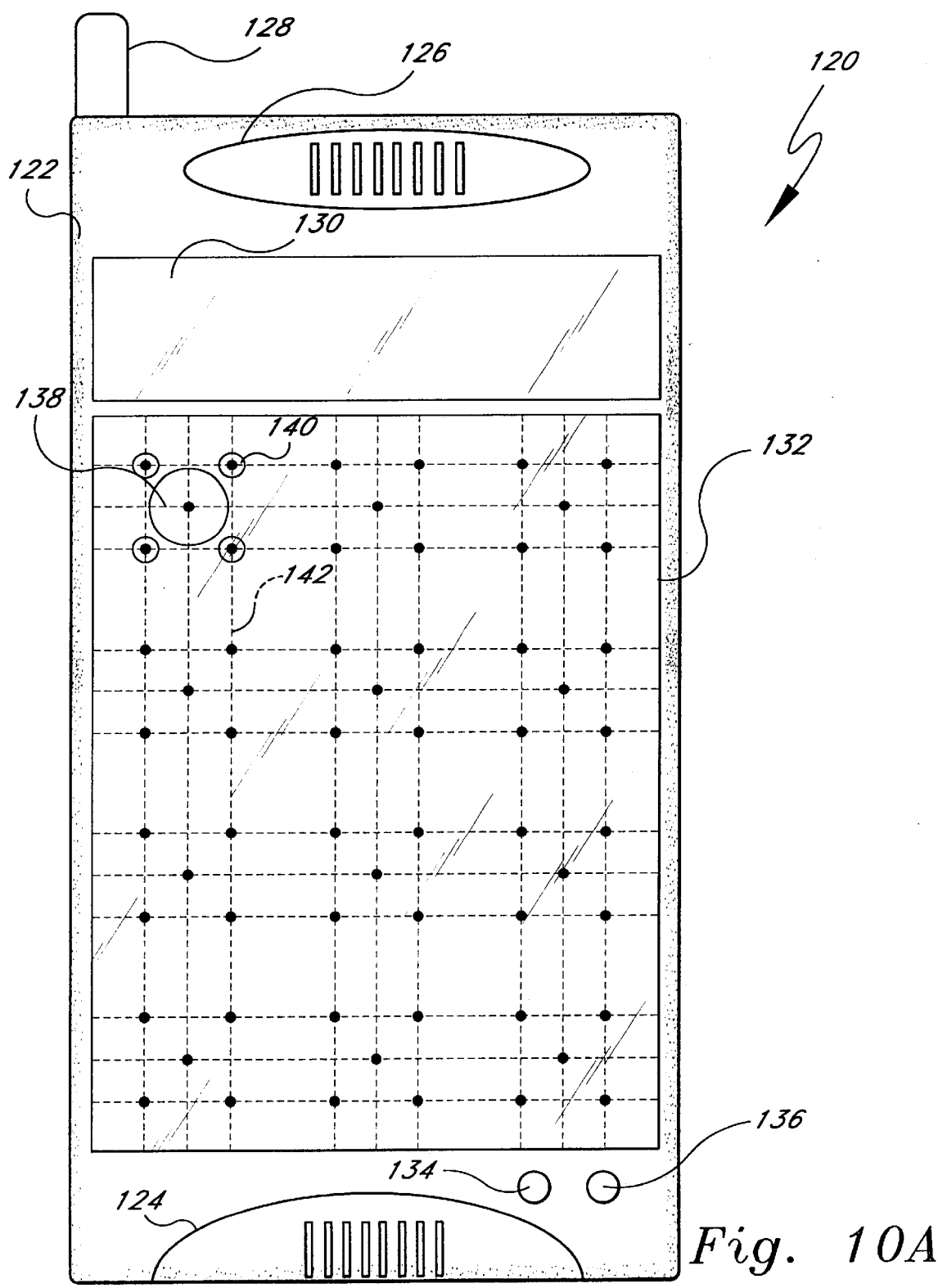
FIG. 10A is a front view of a mobile telephone with a touch screen LCD utilizing an electronic cluster key configuration according to the invention.

An electronic cluster key arrangement according to the invention is shown in FIG. 10A. This cluster key arrangement is electronically configured in the form of a touch screen liquid crystal display (LCD) 132 mounted within a remote telephone 120 which includes a housing 122, a microphone 124, and a speaker 126. Obviously, this electronically configured touch screen LCD cluster key arrangement may also be configured for use on cellular/mobile telephones, television remote controls, other handheld data entry devices, automotive controls, desktop/wall-mounted/cordless telephones, combination telephone recorders, PDAs, and other electronic devices, according to the desires of the user.

Figure 10B:
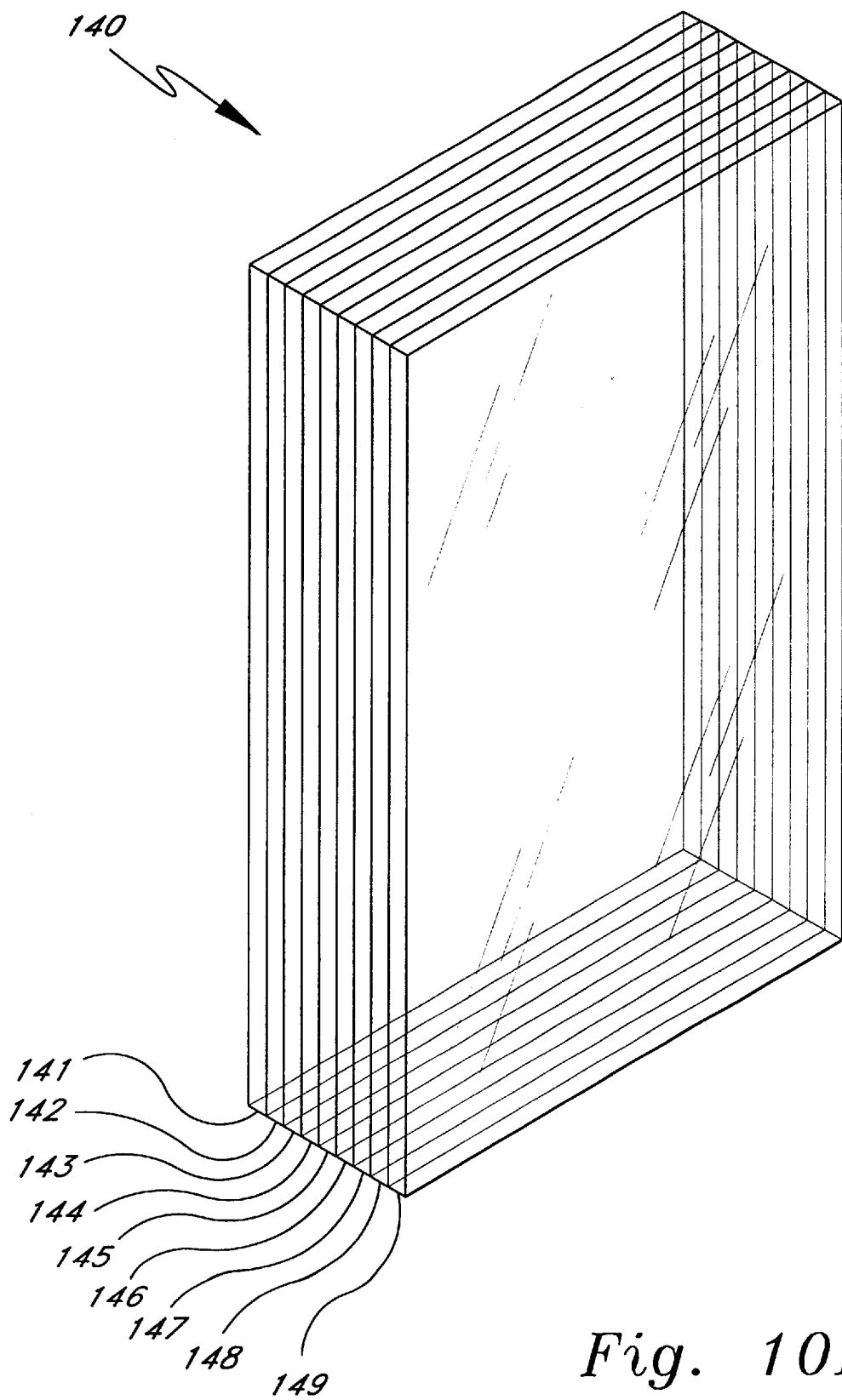
FIG. 10B is a front perspective view of a p-i-n junction amorphous silicon solar cell according to the invention.

The cluster keys in this electronic configuration are preferably displayed in the form of circular, ellipsoidal, pentagonal, etc., images as viewed from the top. The secondary keys each preferably displayed in the form of rectangular, trapezoidal, semi-circular, images which may be elongated to provide more finger contact. The preceding images may be similar to those shown in FIGS. 1, 2, 3, and 7. The housing 122 also includes a liquid crystal display (LCD) 130 for displaying information for the user, a power switch 134, and a mode switch 136. The touch screen LCD may be any conventionally configured touch screen LCD. For example, the touch screen LCD may be configured in the form of an upper glass sheet and a lower glass sheet with a thin layer of liquid crystal material including a pressure sensing element sandwiched between the glass sheets. However, the touch screen LCD may also be configured in combination with a transparent thin film solar cell such as a p-i-n junction type amorphous silicon solar cell 140, as shown in FIG. 10B.

Many approaches to the determination of the location of X and Y coordinates of a touch point based on sensing pressure are well known. A pressure-sensitive input device comprising an X-coordinate detection resistive element connected to mutually parallel vertical conductors and a Y-coordinate detection resistive element connected to mutually parallel horizontal conductors, for detecting the position of a point depressed by a stylus or the like, works by detecting changes in the resistance values of these resistive elements. Switches are used for on-off control of the current flowing into or out of both ends of the X-coordinate detection resistive element and the Y-coordinate detection resistive element, and a voltage detection circuit detects the voltage between the X-coordinate detection resistive element and the Y-coordinate detection resistive element. Multiple inputs can be detected based on the results from the voltage detection circuit when the currents are switched by the switches.

The preceding is but one approach to pressure sensing based location determination known in the art. A more sensitive "smart sensor" type micro-strain gage based localized point sensor located at the midpoint of the keycaps of the primary keys and at the midpoint of the secondary keycaps, located along the circumference of a circle which constitutes the "virtual circle" along which lie the locus of the centers of the secondary keys of the various electronic arrangements. This sensitive pressure sensor can output an analog pressure level and its digitized digital equivalent and likewise the rate of change of pressure and its digitized equivalent. The sensor is a smart sensor in that it can be embedded in the carrier material.

The touch screen LCD 132 could be of the monochromatic type or an active matrix full color display. As is known widely to those skilled in the art, an active matrix generally consists of two sheets between which is inserted an electro-optical material such as a liquid crystal. On one of the sheets is a matrix of transparent conductive blocks, thin film-transistors, a group of conducting addressing lines, and a group of conductive addressing columns. Each transistor has a gate connected to a line, a source connected to a block, and a drain connected to a column. On the second sheet is a counter electrode. On top of the liquid crystal material is attached a flexible transparent film which has patterned thin film semiconductor layers preferably comprising a layer of i(intrinsic)-type semiconductor disposed between a layer of p-type semiconductor and a layer of n-type semiconductor. The p-i-n layer is further sandwiched on either side by a thin layer of transparent conductive layer such as tin oxide, indium tin oxide, or the like to constitute a p-i-n junction amorphous silicon solar cell.

A silicon solar cell connected to the emitter of a common base amplifier biased so that the cell voltage is near to zero, a short-circuit load can be used as a sensor. Collector load is three forward diodes which develop an approximately logarithmic voltage versus current in the current ranges involved. The next stage provides the AC coupling for the pulses, so that the sensitivity of the sensing system is essentially independent of the light level on the cell. This stage is an operational amplifier with a bypass on the feedback for high AC gain and low direct current DC gain. This network also has a low-pass net to reject noise spikes picked up from the environment. The coverage of the conductive layers by an actuating finger causes shadowing which results in a decreased current output proportional to the area shadowed.

A preferable p-i-n junction amorphous silicon solar cell 140 is shown in FIG. 10B. This p-i-n junction amorphous silicon solar cell 140 includes nine layers 141–149. Layer 141 is a transparent conductive tin oxide layer. Layer 142 is a transparent layer of p-type semiconductor. Layer 143 is a transparent layer of i-type semiconductor. Layer 144 is a transparent layer of n-type semiconductor. Layer 145 is a transparent conductive tin oxide layer. Layer 146 is a transparent insulating silicon-dioxide layer. Layer 147 is a transparent layer containing a horizontal or vertical electrical grid. Layer 148 is a transparent insulating silicon-dioxide layer. Layer 149 is a transparent layer containing a horizontal or vertical electrical grid. Once this p-i-n junction amorphous silicon solar cell 140 is attached to an LCD, the solar cell 140 is covered with a transparent plastic layer to protect the cell from the environment. In actuality the solar cell and associated layers are deposited on the plastic layer which is then inverted and attached to the glass.

The p-i-n junction amorphous silicon solar cell is scribed into smaller portions comprising one primary portion and at least one peripheral secondary portion (preferably four secondary portions around the primary portion) to configure an electronic cluster key. The p-i-n junction amorphous silicon solar cell include at least one vertical and horizontal grid of transparent conductors laid in between two transparent insulating layers of the thin film variety such as silicon dioxide. The p-i-n junction amorphous silicon solar cell's two conductive transparent coatings of tin oxide, indium tin oxide, or the like, can be combined in series using techniques well known to persons skilled in the art to provide a trickle charge at approximately 12–14 volts. One approach to series connection entails using a laser to scribe and separate the initial tin oxide coating into islands, using a photoresist mask on the edge to prevent the subsequent layers of p,i,n from touching the conductive layer. Thereafter, the mask is removed and the second tin oxide layer is applied which connects the top surface of the second cell to the bottom surface of the first cell, resulting in a series connection. Other intervening steps are well known to those skilled in the art. The p-i-n junction amorphous silicon solar cell may include capacitors and/or pressure sensors at the center of each key which are all deposited on a flexible transparent substrate such as Kapton and then glued on to the LCD. Kapton or other high temperature plastic is used to withstand high temperatures associated with chemical vapor deposition of amorphous silicon. It is possible to integrate the processing of the solar cell and the LCD based on active matrix thin film transistors (TFTs).

The LCD is preferably an active matrix TFT display which preferably displays the primary key as a white key with black characters for most contrast and which preferably displays the secondary key alphabet characters in a particular color such as red. Preferably secondary key function symbols are displayed in green, secondary key characters such as the AT sign (@) are displayed in blue, and secondary key control symbols such as YES/SEND are displayed in yellow with green letters and NO/END are displayed in yellow with red letters. Obviously, a variety of other color assignments are possible.

The cluster key arrangement is configured utilizing a keyboard emulator within the remote telephone in accordance with the mode selected by the user using the mode switch. FIG. 10A illustrates one arrangement showing a cluster key arrangement comprising a set of twelve cluster keys arranged in four rows by three columns. The primary key for a particular cluster key is preferably displayed in the form of a circularly, ellipsoidally, pentagonally, etc., shaped image as viewed from the top. The secondary keys are each preferably displayed in the form of a rectangularly, trapezoidally, or semi-circularly, shaped image which may be elongated to provide more finger contact. Each electronically configured cluster key includes a primary key location 138 surrounded by at least one secondary key location 140. By touching a particular key location on the touch screen LCD 132, the user activates an electrical signal which passes through an electrical matrix formed by a plurality of contact lines 142 interconnecting each of the particular key locations. The electrical signal is delivered to a processing unit stored within the remote telephone 120, which is then converted into a symbol and displayed on the LCD 130. The remote telephone also includes circuitry which precludes the simultaneous activation of more than one key location of al particular cluster key.

The electronic or opto-electronic mutually exclusive cluster key arrangement works on the same basis of preprocessing as was done in the mechanical cluster key arrangements wherein only one signal could be generated at a time. In the electronic cluster key arrangement the preprocessing is based on sensing one or more variables such as contact pressure or shadowing of a solar cell's microcell element. Both analog levels and digital/logical inputs are used in preprocessing. Other types of sensing such as capacitive is also possible. Appropriate grid work of conductors and electronics which is well known to those skilled in the art will be used, entailing the use of digital and analog mutiplexers, operational amplifiers polling elements and the like. In a pure LCD cluster key arrangement, wherein a pressure sensor alone is the sensing element, in the trivial case where one uses a stylus, such as is done in the use of PDAs currently available in the market place called "Palmtops" (made by 3Com, Hewlett Packard, Casio, Philips, etc.) the sensing and interpretation is easy. These devices utilize a distributed or wide area logical pressure sensor which provides a logical YES output for a selected positional area. These preceding devices do not work with fingers reliably since the keycaps are too small.

In the present invention, since there is a certain amount of shared "real estate" due to clustering, the user is intentionally allowed to press part of an adjacent key (principally the primary key while pressing a secondary key. Many approaches to the determination of the location of X and Y coordinates of a touch point based on sensing pressure are well known. A pressure sensitive input device comprising an X-coordinate detection resistive element connected to mutually parallel vertical conductors and a Y-coordinate detection resistive element connected to mutually parallel horizontal conductors, for detecting the position of a point depressed by a stylus or the like, works by detecting changes in the resistance values of these resistive elements.

The present invention utilizes either a distributed or wide area logical pressure sensor alone which provides a logical YES output for a selected positional area, or a low threshold central pressure sensor in combination with other detected readings such as an applied pressure, rate of applied pressure, or shadowing. Switches are used for on-off control of the current flowing into or out of both ends of the X-coordinate detection resistive element and the Y-coordinate detection resistive element, and a voltage detection circuit detects the voltage between the X-coordinate detection resistive element and the Y-coordinate detection resistive element. Multiple inputs can be detected based on the results from the voltage detection circuit when the currents are switched by the switches.

The preceding is but one approach to pressure sensing based location determination known in the art. A more sensitive "smart sensor" type micro-strain gage based localized point sensor located at the midpoint of the keycaps of the primary keys and at the midpoint of the secondary keycaps (the midpoints are mildly, textured to facilitate tactile feedback without optical degradation), located along the circumference of a circle which constitutes the "virtual circle" along which lie the locus of the centers of the secondary keys of the various electronic arrangements. This sensitive pressure sensor can output an analog pressure level and its digitized digital equivalent and likewise the rate of change of pressure and its digitized equivalent. The sensor is a smart sensor in that it can be embedded in the carrier material.

The first level of mutual exclusivity is rather trivial. The system logic will not accept inputs from two different cluster keys; such dual activation attempt will occur when a user inadvertently presses two adjacent secondary keys belonging to two. different clusters (the system will output an error message and sound a beep asking the user to move the finger a little closer to the center of the cluster). It can also occur when one purposely tests the system by pressing keys from clusters that are not adjacent (this will merely elicit a beep and optional error message). Once the finger is operating within a cluster, the finger perhaps overlaps a little over let us say 3 keys . . . . The intended secondary key (let us say the alphabet B), the corner of the primary key (which is the number 2) and a portion of the adjacent secondary key (say the letter A) . . . under these circumstances, the pressure sensor that is distributed over the entire "keycap" areas of both the secondary keys and the primary key will generate a logical YES for these keys. However, the more sensitive pressure sensor located in the middle (lower threshold) will in most instances have an output only in the intended secondary key of B. This output in reality has two components, an analog level (or its digitized equivalent) representing the amount of or relative amount of pressure (this is likely to be the highest in the intended secondary key since presumably the finger tip is acting on it. For further reliability, a rate input will also be generated in identical fashion. When uniqueness is established the logical outputs from the other two keys are precluded from proceeding further. A simple implementation would accomplish this inside the box with conventional electronics. It is also possible to implement this in solid state or monolithic way by opening the conductive pathway from the non intended keys thus making it mutually exclusive. It is noted that a second pressure sensor, i.e., the generalized pressure sensor also needs to be there for another case, i.e. when one attempts to provide a very clean input by using a pen tip or stylus as is done on Palmtops these days. Of course they are doing it because the current art is deficient in that it provides no choice of finger actuation because the keycaps are based on the emulation of QWERTY type keys which are tiny.

However, the pressure sensing area is mostly in a restricted smaller area around the center. The centers of the adjacent keys are located far enough apart that they result in one or more different levels of pressure generated by a pressing finger. The key associated with the higher level is selected as representing the fingertip which better represents the intended key. In the embodiment with the solar cell, the pressing of a key generates both an analog signal representing the amount of shadowing of a key cap by a operating finger and a digital/logical output which are used in preprocessing singly or in combination with the outputs from the pressure sensor. One approach involves picking for comparison of the shadowing levels only those keys whose pressure sensors have generated a logical YES and simultaneously picking for comparison of the pressure levels only those keys whose shadowing has generated a logical YES. In this scheme of preprocessing, at any stage upon identifying a reliable output such as by the use of a logical AND of the pressure and shadow/solar cell sensors further processing is stopped. The early and reliable identification of an input precludes the activation or consideration of another input in this mutually exclusive electronic cluster key arrangement.

It is to be understood that the present invention is not limited to the embodiments described above, but encompasses any and all embodiments within the scope of the following claims.

I claim:

1. A cluster key arrangement comprising:
   at least one cluster key, said cluster key comprising:
      a single primary key;
      at least one secondary key, said secondary key being located immediately adjacent to said primary key of said cluster key; and
      mutual exclusivity selecting means for selecting said primary key or said secondary key in a mutually exclusive manner;

wherein when both said primary key and said secondary key have met a threshold for actuation close in time to each other, said mutual exclusivity selecting means includes the use of a difference between said primary and said secondary key other than a difference in order of activation of said primary and said secondary key to select between said primary and said secondary key;

each of said primary and secondary keys is individually actuable;

each of said primary key and said secondary key upon actuation move in a direction substantially parallel to the motion of the other of said primary and said secondary key upon actuation;

each of said primary key and said secondary key has an associated electrical contact, activation of each said electrical contact sends a signal which indicates an input from said cluster key arrangement, and said mutual exclusivity selecting means selects between said primary key and said secondary key during preprocessing prior to activation of any one of said electrical contacts.

2. A cluster key arrangement according to claim 1, wherein:

each of said primary and secondary keys is arranged on a planar surface; and each of said primary and secondary keys upon actuation moves in a direction substantially perpendicular to said planar surface.

3. A cluster key arrangement according to claim 1, wherein each of said primary key and said secondary key has a button profile having an arcuate shape, said arcuate shape being selected from the group consisting of dome shaped, convex, trough, and concave.

4. A cluster key arrangement according to claim 1, wherein said primary key has a top view which is shaped circularly, ellipsoidally, pentagonally, hexagonally, heptagonally, or octagonally.

5. A cluster key arrangement according to claim 1, wherein:

the number of said cluster keys is at least two;

each said primary key has a primary key label, each primary key label including at least one primary key symbol selected from the group consisting of numerals, an asterisk symbol, and a pound sign;

each said secondary key has a secondary key label, each secondary key label including at least one secondary key symbol selected from the group consisting of alphabetic characters and function designations.

6. A cluster key arrangement according to claim 1, wherein each said cluster key is separated by a gap from any other of said cluster keys.

7. A cluster key arrangement according to claim 1, wherein each said primary key and each said secondary key includes a top surface and an opposing underside surface;

each said top surface includes a first portion;

each said underside surface includes a second portion and a third portion;

said third portion of each said key is positioned with respect to the top surface of said key such that if a user applies pressure to the top surface of said key, said key will be activated through said third portion; and said second portion of each said key is connected through a mutual exclusivity actuator to said second portion of at least one adjacent key of said keys, such that when the user presses one of said keys, said second portion of said pressed one of said keys interacts with said second portion of said adjacent key to preclude said adjacent key from being activated.

8. A cluster key arrangement according to claim 1, wherein said mutual exclusivity selecting means uses differences in pressure to select between said primary key and said secondary key.

9. The cluster key arrangement according to claim 1, wherein said mutual exclusivity selecting means uses differences in shadowing to select between said primary key and said secondary key.

10. A cluster key arrangement according to claim 1, wherein the number of said secondary keys in each of said at least one cluster key is at least four.

11. A cluster key arrangement according to claim 1, wherein said secondary key is smaller in surface area than said primary key.

12. A cluster key arrangement according to claim 1, wherein the number of said secondary keys in each said cluster key is at least two, and said mutual exclusivity selecting means selects between each said secondary key of each said cluster key in a mutually exclusive manner.

13. A cluster key arrangement according to claim 1, wherein:

said primary key includes a single conductive pathway associated with said primary key, said conductive pathway associated with said primary key being normally open;

said secondary key includes a single conductive pathway associated with said secondary key, said conductive pathway associated with said secondary key being normally open; wherein said conductive pathway associated with said primary key is closed when said primary key is selected, and said conductive pathway associated with said secondary key is closed when said secondary key is selected.

14. A cluster key arrangement according to claim 1, in combination with an electronic device, said electronic device being selected from the group consisting of a telephone, a remote control, a computer, and a personal digital assistant;

wherein the number of cluster keys is twelve;

the functions of said electronic device are controlled by said primary and secondary keys of said cluster keys; and said combination includes no keys other than said primary and secondary keys of said twelve cluster keys.

15. A cluster key arrangement according to claim 1, in combination with an electronic device, said electronic device being selected from the group consisting of a telephone, a remote control, a computer, and a personal digital assistant; wherein:

said electronic device includes a liquid crystal display;

said cluster key arrangement includes at least two secondary keys; and at least two of said secondary keys are arrow keys.

16. A cluster key arrangement according to claim 1, wherein said cluster key arrangement includes at least two secondary keys; and at least one of said secondary keys is a mode key.

17. A cluster key arrangement according to claim 1, wherein:

the number of cluster keys is at least twelve;

twelve of said at least twelve cluster keys are configured in an arrangement of three columns by four rows;

at least one of said cluster keys includes at least four secondary keys;

each said primary key has at least one primary key label, each primary key label including at least one primary key symbol selected from the group consisting of numerals, an asterisk symbol, and a pound sign;

each said secondary key has at least one secondary key label, each secondary key label including at least one secondary key symbol selected from the group consisting of alphabetic characters and function designations.

18. A cluster key arrangement according to claim 17, wherein each of said cluster keys includes at least four secondary keys;

at least one of said secondary keys is a mode key; and said cluster key arrangement emulates a standard keyboard.

19. A cluster key arrangement according to claim 17, wherein said numerals are selected from the group consisting of ten numbers from 0 to 9, and wherein said alphabetic characters are selected from the group consisting of 26 letters from A to Z.

20. A cluster key arrangement according to claim 19, wherein said four rows include a top row, and said primary keys of said three columns of said top row are labelled 1, 2, and 3 respectively from left to right.

21. A cluster key arrangement according to claim 20, wherein:

said cluster key of said primary key labelled 2 of said top row includes secondary keys labelled A, B, and C; and said secondary key labelled A is located at the upper left of said primary key labelled 2 of said top row.

22. A cluster key arrangement according to claim 1, wherein:

said mutual exclusivity selecting means includes a preprocessor, and said preprocessor includes at least one configuration selected from the group consisting of an electronic configuration and an opto-electronic configuration.

23. A cluster key arrangement according to claim 22, wherein said primary key is pentagonally shaped, the number of secondary keys in each cluster key is five, and said five secondary keys are circumferentially distributed about the five sides of said primary key.

24. A cluster key arrangement according to claim 22, further comprising an integrated pressure sensing element.

25. A cluster key arrangement according to claim 22, further comprising a p-i-n junction amorphous silicon solar cell with two conductive transparent coatings.

26. A cluster key arrangement according to claim 22, further comprising a conductive grid.

27. A cluster key arrangement according to claim 22, further comprising a mechanical cluster key configuration.

28. A cluster key arrangement according to claim 22, wherein the preprocessor comprises electronics that use differences in pressure to select one of said primary keys or one of said secondary keys over an adjacent one of said primary and secondary keys.

29. A cluster key arrangement according to claim 22, wherein said mutual exclusivity selecting means includes an embedded smart sensor.

30. A cluster key arrangement according to claim 22, wherein said cluster key arrangement is electronically configured in the form of a touch screen liquid crystal display.

31. A cluster key arrangement according to claim 30, wherein said touch screen liquid crystal display is an active matrix thin film transistor display.

32. A cluster key arrangement according to claim 31, further comprising a layer of i-type semiconductor disposed between a layer of p-type semiconductor and a layer of n-type semiconductor.

33. A cluster key arrangement according to claim 32, further comprising two conductive transparent coatings of tin oxide or indium tin oxide to provide two layers, wherein said layers are capable of being combined in series to provide a trickle charge.

34. A cluster key arrangement comprising:

at least one cluster key, said cluster key comprising:

a single primary key;

at least one secondary key, said secondary key being located immediately adjacent to said primary key of said cluster key; and a mutual exclusivity actuator for selecting said, primary key or said secondary key in a mutually exclusive manner;

wherein each said cluster key includes a support structure supporting said cluster key;

said mutual exclusivity actuator interacts with said support structure of said cluster key, such that a user may mutually, exclusively select between said primary key and said secondary key;

each of said primary and secondary keys is individually actuable;

each of said primary key and said secondary key upon actuation move in a direction substantially parallel to the motion of the other of said primary key and said secondary key upon actuation;

each of said primary key and said secondary key has an electrical contact, activation of each said electrical contact sends a signal which indicates an input from said cluster key arrangement, and said mutual exclusivity actuator selects between said primary key and said secondary key during preprocessing prior to activation of any one of said electrical contacts.

35. A cluster keyboard comprising:

at least one cluster key, said cluster key comprising:

a primary key, said primary key having a first support structure that supports the primary key;

at least one secondary key, said secondary key being located immediately adjacent to said primary key of said cluster key, said secondary key having a second support structure that support the secondary key;

a mutual exclusivity actuator, said mutual exclusivity actuator interacting with said first support structure of said primary key and with said second support structure of said secondary keys, such that a user may mutually exclusively select between said primary key and said secondary key;

wherein each of said primary and secondary keys is individually actuable.

36. A method of inputting data using a keyboard in which more than one key is located within the width of a fingertip, comprising the steps of:

providing a cluster keyboard comprising a first cluster key and a second cluster key, each said cluster key comprising at least two keys:

one of said keys of each cluster key being a primary key;

at least one of said keys of each cluster key being a secondary key, said secondary keys being located immediately adjacent and circumferentially to said primary key of said cluster key;

receiving input signals from two of said keys, said input signals being received close in time to each other; and processing said input signals in accordance with a predetermined set of logical rules such that the cluster keyboard recognizes said input signal from only one of said keys;

wherein said set of logical rules includes a plurality of sensory thresholds;

at least one of said sensory thresholds is a threshold for actuation;

wherein when both said primary key and said secondary key have met said threshold for actuation close in time to each other, said set of logical rules includes the use of a difference between said primary and said secondary key other than a difference in order of activation of said primary and said secondary key to select between said primary and said secondary key.

37. A method of inputting data according to claim 36, wherein said set of logical rules uses differences in pressure to select one of said keys.

38. A method of inputting data according to claim 36, wherein said set of logical rules uses differences in shadowing to select one of said keys.

39. A method of inputting data using a keyboard in which more than one key is located within the width of a fingertip, comprising the steps of:

providing a cluster keyboard comprising a first cluster key and a second cluster key, each said cluster key comprising at east two keys:

one of said keys of each said cluster key being a single primary key, said primary key having a support structure that supports the primary key;

at least one of said keys of each cluster key being a secondary key, said secondary key being located immediately adjacent and circumferentially to said primary key of said cluster key, said secondary key having a support structure that supports the secondary key;

actuating two of said keys, said two of said keys being actuated close in time to each other, thereby actuating a mutual exclusivity actuator;

said mutual exclusivity actuator interacting with said support structure of said two actuated keys, said mutual exclusivity actuator acting to exclude input from one of said two actuated keys.

\* \* \* \* \*